(12) United States Patent
Usami

(10) Patent No.: US 7,974,171 B2
(45) Date of Patent: Jul. 5, 2011

(54) OPTICAL RECORDING METHOD, OPTICAL REPRODUCTION METHOD, OPTICAL RECORDING APPARATUS, AND OPTICAL RECORDING MEDIUM

(75) Inventor: Yoshihisa Usami, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 517 days.

(21) Appl. No.: 12/280,514

(22) PCT Filed: Feb. 21, 2007

(86) PCT No.: PCT/JP2007/053144
§ 371 (c)(1),
(2), (4) Date: Aug. 22, 2008

(87) PCT Pub. No.: WO2007/097352
PCT Pub. Date: Aug. 30, 2007

(65) Prior Publication Data
US 2009/0022031 A1    Jan. 22, 2009

(30) Foreign Application Priority Data
Feb. 23, 2006  (JP) .................... 2006-046741

(51) Int. Cl.
*G11B 7/00*    (2006.01)
(52) U.S. Cl. .................... 369/103; 369/124.09
(58) Field of Classification Search .......... None
See application file for complete search history.

(56) References Cited

U.S. PATENT DOCUMENTS
2002/0075776 A1 * 6/2002 Kasazumi et al. .......... 369/47.5
2002/0191239 A1   12/2002 Psaltis et al.
2005/0088947 A1 * 4/2005 Ichihara et al. ............ 369/103

FOREIGN PATENT DOCUMENTS
| EP | 1351226 A1 | 10/2003 |
| EP | 1460622 A1 | 9/2004 |
| JP | 2004-177958 A | 6/2004 |
| JP | 2005-017730 A | 1/2005 |
| JP | 2005-275258 A | 10/2005 |
| WO | 2006003077 A1 | 1/2006 |

OTHER PUBLICATIONS

"Holographic media-Ready for launch, achieved 200Gbytes in 2006", Nikkei Electronics, Jan. 17, 2005, pp. 105-114.
Hideyoshi Horimai et al., Advanced Collinear Holography, Optical Review, Mar. 1, 2005, pp. 90-92, vol. 12, No. 2, Springer, Berlin, DE.
Extended European Search Report including Supplementary European Search Report for EP 07 71 4644 dated Feb. 10, 2010.

* cited by examiner

*Primary Examiner* — Paul Huber
(74) *Attorney, Agent, or Firm* — Sughrue Mion, PLLC

(57) ABSTRACT

The present invention provides an optical recording method including: recording information on a recording layer for holographically recording information in an optical recording medium by irradiating the optical recording medium with an information beam and a reference beam, and repetitively recording information on the recording layer while moving at least any one of the information beam and reference beam and the recording layer along the surface of the recording layer, thereby being capable of shift-multiplex recording operations, wherein the optical recording medium is irradiated on a recording pulse basis, the peak intensity of light of the recording pulse is 0.1 mW to 100 mW, the irradiation time is 0.05 nsec to $1\times10^5$ nsec, and the irradiation of recording pulse is performed 5 times to $1\times10^7$ times per 1 msec; and also provides an optical recording apparatus and an optical recording medium.

11 Claims, 8 Drawing Sheets

OPTICAL RECORDING METHOD, OPTICAL REPRODUCTION METHOD, OPTICAL RECORDING APPARATUS, AND OPTICAL RECORDING MEDIUM

This application is a 371 of PCT/JP2007/053144, filed Feb. 21, 2007.

TECHNICAL FIELD

The present invention relates to an optical recording method for recording information by holography on an optical recording medium, an optical recording apparatus used for recording information by holography on an optical recording medium, and an optical recording medium.

BACKGROUND ART

A method for recording on an optical recording medium by holography generally utilizes optical interference between an image information-carrying information beam (object beam) and a reference beam inside the medium to produce an interference image (interference fringes), and records it in the medium.

Holographic optical recording that involves application of such information and reference beams with their optical axes matched is referred to as "collinear holography".

Application of information and reference beams by collinear holography produces interference fringes in the recording layer of an optical recording medium, thereby recording information therein. Reproduction of the information recorded in the optical recording medium is achieved by application of a reproduction beam, which is identical to the reference beam used for recording, from the same direction as the reference beam. This leads to generation of a diffracted beam from the interference image formed of interference fringes as optical information, and the optical information is reproduced by collecting the diffracted beam.

As a method for increasing the storage capacity of optical recording media, there are proposed multiplex recording methods for increasing the density of the interference fringes recorded. More specifically, shift-multiplex recording, angle-multiplex recording, wavelength-multiplex recording, and phase-multiplex recording have been utilized.

Among these recording strategies, the shift-multiplex recording has high compatibility with conventional CD and DVD recording methods where information is recorded on a spinning disc, and offers high random access performance. This is because in this recording method, additional information, or interference image, is placed one after another on the initial recorded information while slightly moving either a beam spot or an optical recording medium along the surface of the recording layer. For this reason, shift-multiplex recording is employed for the above-mentioned collinear holography where single lens is used for recording (see Non-Patent Literature 1).

As shown in FIG. 4, shift-multiplex recording by collinear holography is carried out on a recording pulse beam basis, i.e., on a recording beam spot basis, which beam spot has a predetermined size and is produced by focusing an information beam and reference beam 39, which have been passed through an object lens 12, in a recording layer of an optical recording medium 21. When a beam spot has been applied to a recording area and information is recorded, the optical recording medium 21 rotates by one pitch of a distance of p in a counterclockwise direction which is opposite to the direction indicated by the arrow in FIG. 4. In this way a beam spot is applied for every one-pitch rotation to the next recording area, whereby recorded information is sequentially multiplexed.

In the shift-multiplex recording, when the recording pulse is used, a portion where the information beam and reference beam are focused (a recording spot formed in a substantially circular shape with a spot diameter of about 200 μm) contains information of approximately 30,000 bits (about 4,000 bites), and the information is recorded as one page, and information is recorded on a data page basis (see Patent Literature 1).

The reason why such a large volume of information of approximately 30,000 bits is recorded in one data page is to increase the recording density.

In order to record such a large volume of information, for example, as shown in FIG. 1, a recording pulse 26 is used once every approximately 200 μsec with a peak intensity of light of 100 W for 30 nsec as irradiation time.

However, in order to record such a large volume of information in a short period of time, like 30 nsec of the light irradiation time, 15 mW is required as the average energy amount. As an average energy density required for recording in the recording spot of having a diameter of about 200 μm, about 9.5 mW/cm$^2$ is required. Therefore, as a total recording energy, energy of about 1 mJ/cm$^2$ is necessary.

However, in order to record information with a high energy of about 1 mJ/cm$^2$ in a short period of light irradiation time of 30 nsec, it is necessary to prepare a light source having a relatively high-capacity, a large size spatial light modulator (SLM) for processing a large volume of information of approximately 30,000 bits, as well as a photodetector composed of CMOS and the like, which makes it difficult to use optical recording method by holography to small-size optical systems such as optical systems used for present CD and/or DVD.

An optical recording method that allows for downsizing of optical systems by reducing the irradiation energy per one recording during irradiation of an information beam and a reference beam as well as allows for application of holographic recording to small-size optical systems used for CD and/or DVD, and an optical recording apparatus and an optical recording medium that can achieve the purposes have not yet been provided so far, and it has been desired to provide the method, apparatus and optical recording medium.

[Patent Literature 1] Japanese Patent Application Laid-Open (JP-A) No. 2004-177958

[Non-Patent Literature 1] Nikkei Electronics, pp. 105-114, Jan. 17, 2005

DISCLOSURE OF INVENTION

An object of the present invention is to solve the above-mentioned conventional problems and to achieve the following purposes. Specifically, the present invention aims to provide an optical recording method and an optical recording apparatus each of which allows for downsizing of optical systems by reducing the irradiation energy per single recording during irradiation of an information beam and a reference beam as well as allows for applications of holographic recording to small-size optical systems used for CD and/or DVD, and an optical recording medium.

Means for solving the above-mentioned problems are as follows. Specifically,

<1> An optical recording method including:
recording information on a recording layer for holographically recording information in an optical recording medium by irradiating the optical recording medium with an information beam and a reference beam, and repetitively recording information on the recording layer while moving at least any one of the information beam and reference beam and the recording layer along the surface of the recording layer, thereby being capable of shift-multiplex recording operations, wherein the optical recording medium is irradiated on a recording pulse basis, the peak intensity of light of the recording pulse is 0.1 mW to 100 mW, the irradiation time is 0.05 nsec to $1 \times 10^5$ nsec, and the irradiation of recording pulse is performed 5 times to $1 \times 10^7$ times per 1 msec.

<2> The optical recording method according to the item <1>, wherein information of 1 bit to 1,024 bits is recorded by irradiating with a single recording pulse.

<3> The optical recording method according to the item <2>, wherein the irradiation of the single recording pulse is performed with the use of a substantially circular recording spot, and the recording spot has an average diameter of 0.1 μm to 100 μm.

<4> The optical recording method according to any one of the items <1> to <3>, wherein information is shift-multiplex-recorded by irradiating with the information beam and reference beam in a circumferential direction of the recording layer while rotating the optical recording medium having the recording layer.

<5> The optical recording method according to any one of the items <1> to <4>, wherein the optical recording medium has a first substrate, the recording layer, a filter layer and a second substrate in this order.

<6> The optical recording method according to any one of the items <1> to <5>, wherein the optical recording medium is a reflective holographic recording medium.

<7> The optical recording method according to any one of the items 1 to 6, wherein the optical recording medium is irradiated with the information beam and reference beam so that the optical axis of the information beam is collinear with the optical axis of the reference beam.

<8> The optical recording method according to any one of the items <5> to <7>, wherein the filter layer includes a coloring material-containing layer containing at least one of a pigment and a dye.

<9> The optical recording method according to any one of the items <5> to <8>, wherein the filter layer includes a coloring material-containing layer containing at least one of a pigment and a dye, and a cholesteric liquid crystal layer on the coloring material-containing layer.

<10> The optical recording method according to any one of the items <5> to <9>, wherein the filter layer includes dielectric material-deposited layer on the coloring material-containing layer.

<11> The optical recording method according to any one of the items <5> to <10>, wherein the filter layer includes a single cholesteric liquid crystal layer.

<12> The optical recording method according to any one of the items <5> to <11>, wherein the filter layer is a laminate consisting of two or more cholesteric liquid crystal layers.

In the optical recording/reproducing apparatus according to <12>, there are two or more cholesteric liquid crystal layers and thus there is no variation in selective reflection wavelength due to a change in incident angle, and neither of the information beam, reference beam and reproduction used for recording or reproduction reaches the reflective film. Thus, generation of light diffusion due to diffused reflection on the reflection surface can be avoided. Accordingly, noises that occur due to the diffused light are not superimposed with the reproduced image and thus are not detected by a CMOS sensor or CCD, allowing detection of the reproduced image to an extent that enables error correction. The noise component due to diffused light becomes more problematic as the degree of multiplexing of holograms increases. More specifically, as the degree of multiplexing increases, e.g., to 10 or higher, the diffraction efficiency per hologram significantly decreases. Thus the presence of the noise component due to diffused light makes detection of the reproduced image very difficult. With this configuration, such difficulty can be overcome and unprecedented high-density image recording can be achieved.

<13> The optical recording method according to any one of the items <11> to <12>, wherein the selective reflection wavelength region in the cholesteric liquid crystal layer is continuous.

<14> The optical recording method according to any one of the items <11> to <13>, wherein the cholesteric liquid crystal layer contains at least a nematic liquid crystal and a photoreactive chiral compound.

<15> The optical recording method according to any one of the items <11> to <14>, wherein the cholesteric liquid crystal layer has circular polarization separation characteristics.

<16> The optical recording method according to any one of the items <11> to <15>, wherein the director axis of molecules of the cholesteric liquid crystal layers rotates in the same direction.

<17> The optical recording method according to any one of the items <11> to <16>, wherein the cholesteric liquid crystal layers have different central selective reflection wavelengths.

<18> The optical recording method according to any one of the items <11> to <17>, wherein the selective reflection wavelength ranges of the cholesteric liquid crystal layers cover a wavelength range of 100 nm or more.

<19> The optical recording method according to any one of the items <5> to <18>, wherein the filter layer transmits a first beam and reflects a second beam that is different from the first beam.

<20> The optical recording method according to the item <19>, wherein the wavelength of the first beam is 350 nm to 600 nm, and the wavelength of the second beam is 600 nm to 900 nm.

<21> The optical recording method according to any one of the items <5> to <20>, wherein the filter layer is used as a selective reflection film for optical recording medium that records information by holography.

<22> The optical recording method according to any one of the items <5> to <21>, wherein the filter layer contains a photo-reactive chiral compound, the photo-reactive chiral compound has a chiral site and a photo-reactive group, and the chiral site is at least one compound selected from isosorbide compounds, isomannide compounds and binaphthol compounds.

<23> The optical recording method according to the item <22>, wherein the photo-reactive group undergoes trans to cis isomerization about the carbon-carbon double bond by irradiation with light.

<24> The optical recording method according to any one of the items <5> to <23>, wherein the second substrate includes a servo pit pattern.

<25> The optical recording method according to the item <24>, wherein a reflective film is provided on a surface of the servo pit pattern.

<26> The optical recording method according to the item <25>, wherein the reflective film is a metal reflective film.

<27> The optical recording method according to any one of the items <25> to <26>, wherein a first gap layer is provided between the filter layer and reflective film, for smoothing a surface of the second substrate.

<28> The optical recording method according to any one of the items <5> to <27>, wherein a second gap layer is provided between the recording layer and filter layer.

<29> An optical recording apparatus containing:

a shift-multiplex recording unit configured to record information on a recording layer for holographically recording information in an optical recording medium by irradiating the optical recording medium with an information beam and a reference beam, and to repetitively record information on the recording layer while moving at least any one of the information beam and reference beam and the recording layer along the surface of the recording layer, and an irradiation unit configured to irradiate the optical recording medium on a recording pulse basis, wherein the peak intensity of light of the recording pulse is 0.1 mW to 100 mW, the irradiation time is 0.05 nsec to $1 \times 10^5$ nsec, and the irradiation of recording pulse is performed 5 times to $1 \times 10^7$ times per 1 msec.

<30> The optical recording apparatus according to the item <29>, wherein information of 1 bit to 1,024 bits is recorded by irradiation of a single recording pulse.

<31> The optical recording apparatus according to any one of the items <29> and <30>, wherein the irradiation of the single recording pulse is performed with the use of a substantially circular recording spot, and the recording spot has an average diameter of 0.01 μm to 100 μm. The optical recording apparatus according to the item <31> enables recording with less recording energy as compared to those of conventional optical recording apparatuses because the average recording spot diameter is 0.01 μm to 100 μm. Further, the average recording spot diameter is preferably 0.05 μm to 50 μm, still more preferably 0.1 μm to 10 μm, and particularly preferably 0.5 μm to 5 μm.

<32> The optical recording apparatus according to any one of the items <29> to <31>, wherein information is shift-multiplex-recorded by irradiating with the information beam and reference beam in a circumferential direction of the recording layer while rotating the optical recording medium having the recording layer.

<33> The optical recording apparatus according to any one of the items <29> to <32>, wherein the optical recording medium is a reflective holographic recording medium.

<34> The optical recording apparatus according to any one of the items <29> to <33>, wherein the irradiation of the information beam and the reference beam is performed so that the optical axis of the information beam is collinear with that of the reference beam.

<35> An optical recording medium, with information recorded therein, which is recorded by the optical recording method according to any one of the items <1> to <7>.

<36> A method for manufacturing an optical recording medium, including: processing an optical recording medium filter composed of the filter layer in the optical recording medium according to any one of the items <5> to <28> in a shape of the optical recording medium, and forming a filter layer by laminating a second substrate with a substrate, wherein the optical recording medium is the optical recording medium according to the item <35>.

<37> A method for manufacturing an optical recording medium, including forming on a second substrate a filter layer of a laminate consisting of two or more cholesteric liquid crystal layers, wherein the optical recording medium is the optical recording medium according to the item <35>.

<38> An optical reproduction method including:

irradiating an interference image formed on a recording layer by the optical recording method according to any one of the items <1> to <7> with a reproduction beam identical to a reference beam used in the recording of the interference image to thereby reproduce recorded information corresponding to the interference image.

<39> The optical reproducing method according to the item <38>, wherein the recorded information is reproduced by irradiating the interference image with the reproduction beam so that the reproduction beam is irradiated to the interference image at the same angle of incidence at that of the reference beam used in the recording of the interference image in the optical recording medium.

The present invention can provide an optical recording method and an optical recording apparatus each of which allows for downsizing of optical systems by reducing the irradiation energy per single recording during irradiation of an information beam and a reference beam as well as allows for applications of holographic recording to small-size optical systems used for CD and/or DVD, and an optical recording medium.

BEST MODE FOR CARRYING OUT THE INVENTION

Optical Recording Method

Figure 1:
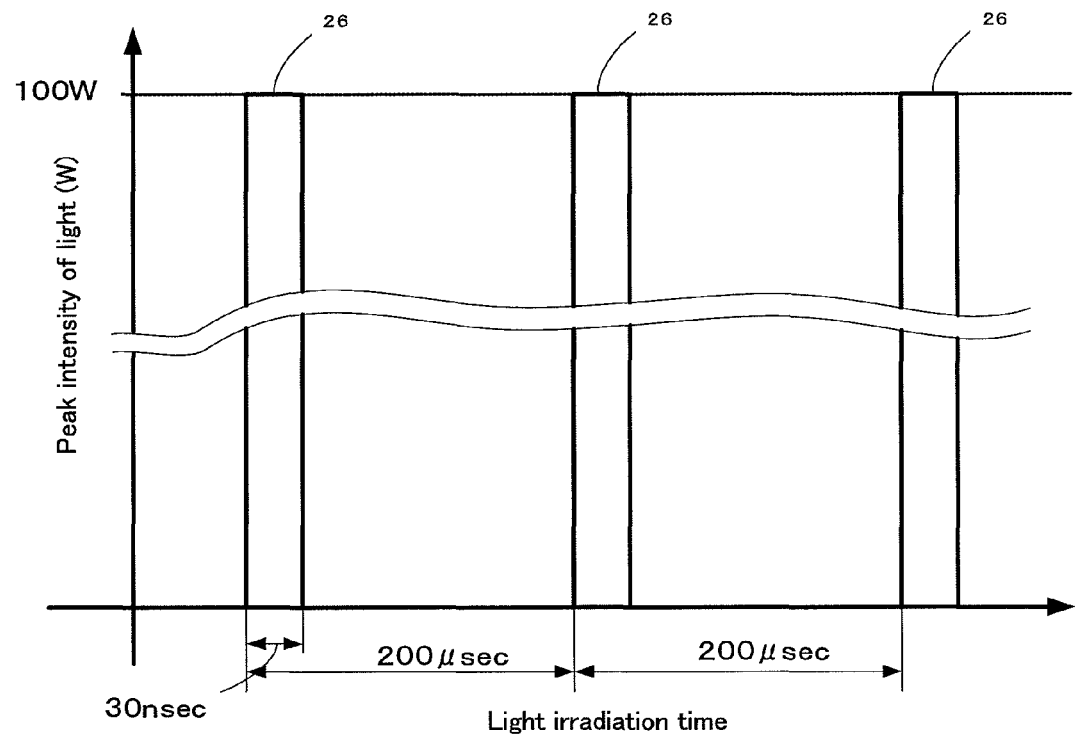
FIG. 1 is a graph showing the relation between the light irradiation time and the recording energy when an optical recording medium is multiply recorded with the use of a conventional information beam and reference beam.
Figure 2:
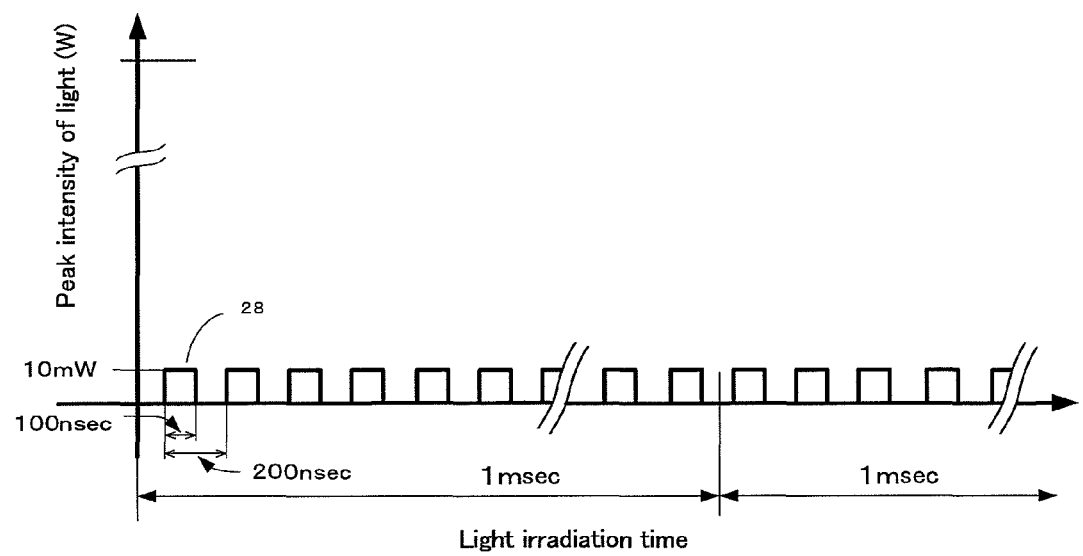
FIG. 2 is a graph showing the relation between the light irradiation time and the recording energy when an optical recording medium is multiply recorded with the use of an information beam and reference beam according to the present invention.

An optical recording method of the present invention includes recording information on a recording layer for holographically recording information in an optical recording medium by irradiating the optical recording medium with an information beam and a reference beam, and repetitively recording information on the recording layer while moving at least any one of the information beam and reference beam and the recording layer along the surface of the recording layer, thereby being capable of shift-multiplex recording operations, wherein the optical recording medium is irradiated on a recording pulse basis, the peak intensity of light of the recording pulse is 0.1 mW to 100 mW, the irradiation time is 0.05 nsec to $1\times10^5$ nsec, and the irradiation of recording pulse is performed 5 times to $1\times10^7$ times per 1 msec, and includes other steps suitably selected in accordance with the necessity. The optical recording method of the present invention is preferably used in a so-called colinear optical recording method in which the irradiation of the information beam and the reference beam is performed so that the optical axis of the information beam is collinear with that of the reference beam.

An optical recording apparatus of the present invention will be also clarified through the following explanation of an optical recording method of the present invention.

<Information Beam and Reference Beam>

The information beam and reference beam are not particularly limited and can be appropriately selected depending on the intended purpose. For example, a coherent laser beam emitted from a light source is preferably used.

The laser beam is not particularly limited, and a laser beam having one or more wavelengths selected from 360 nm to 850 nm is suitably used. The wavelength is preferably 380 nm to 800 nm, more preferably 400 nm to 750 nm, most preferably 500 nm to 600 nm where the center of the visual region is most visible.

If the wavelength is less than 360 nm, designing of optical systems becomes difficult. If it exceeds 850 nm, it may result in low storage capacity.

The light source of the laser beam is not particularly limited and can be appropriately selected depending on the intended purpose. For example, a solid-state laser oscillator, semiconductor laser oscillator capable of continuous oscillation, liquid-state laser oscillator, or gas-state laser oscillator can be used. Among these, a gas-state laser oscillator or semiconductor laser oscillator capable of continuous oscillation can be suitably used.

The method for applying the information and reference beams is not particularly limited and can be appropriately selected depending on the intended purpose. For example, a laser beam from one light source may be split into the information beam and reference beam. Alternatively two laser beams emitted from different light sources may be used as the information beam and reference beam.

The direction in which the information beam and reference beam are applied is not particularly limited and can be appropriately determined depending on the intended purpose. For example, it is preferable that they be applied in such a way that the optical axis of the information beam is collinear with that of the reference beam.

The information beam (object beam) and reference beam are allowed to interfere with each other in an optical recording medium, and the resultant interference fringes are recorded in the optical recording medium for recording of information.

<Recording Pulse>

The recording pulse is a pulse applied to an optical recording medium during a predetermined time frame (nsec), in which a laser beam emitted from the light source is processed into an information beam and a reference beam having a specific intensity of light (mW) by means of a spatial light modulator (SLM) or the like. Interference fringes are generated by irradiation of the recording pulse, and information is recorded on a recording layer as an interference image. The energy used for irradiation of a single recording pulse is a value obtained by multiplying the energy of irradiation (mW) per unit time by the irradiation time (nsec). The peak intensity of light is 0.1 mW to 100 mW, preferably 1 mW to 50 mw, and most preferably 5 mW to 30 mw. When the energy of irradiation is smaller than 0.1 mW, the laser power becomes insufficient, and satisfactory recording may not be performed. When the energy of irradiation is greater than 100 mW, the material of the optical recording medium is deteriorated by the increase in temperature, and signals may not be normally reproduced.

The irradiation time is 0.05 nsec to $1\times10^5$ nsec, preferably 1 nsec to $1\times10^4$ nsec, and more preferably 10 nsec to $1\times10^3$ nsec. The irradiation time is shorter than 0.05 nsec, the laser power becomes insufficient, and satisfactory recording may not be performed. When the irradiation time is longer than $1\times10^5$ nsec, the rotational velocity of the optical recording medium is sometimes considerably lowered.

In the present invention, in order to record information of the same capacity as the conventional capacity in an optical recording medium, the irradiation of recording pulse is performed 5 times to $1\times10^7$ times per 1 msec, more preferably performed $1\times10^3$ times to $1\times10^6$ times, and most preferably performed $1\times10^4$ times to $1\times10^5$ times. When the number of irradiation times is less than 5 times, the rotational velocity of the optical recording medium is sometimes considerably lowered, and when the number of irradiation times is more than $1\times10^7$ times, the laser power becomes insufficient, and information may not be normally recorded.

In the method where optical axes of the information beam and reference beam are colinear, for example, information to be recorded is processed into digital data on a single recording spot-by-spot basis, and in the single recording spot, data of about 4,000 bites (about 30,000 bites) is formed as a page data pattern. When the information to be recorded in a target optical recording medium is image information, the image plane is finely processed into picture elements (pixel), which is the smallest unit of two-dimensional pattern data by means of a spatial light modulator (SLM). In the processing, the image information is processed by arithmetic processing in which a time signal is represented in a frequency range by a computer digital processing system utilizing a Fourier conversion, and the image information is converted in to digital data consisting of values of "0" or "1".

Figure 3:
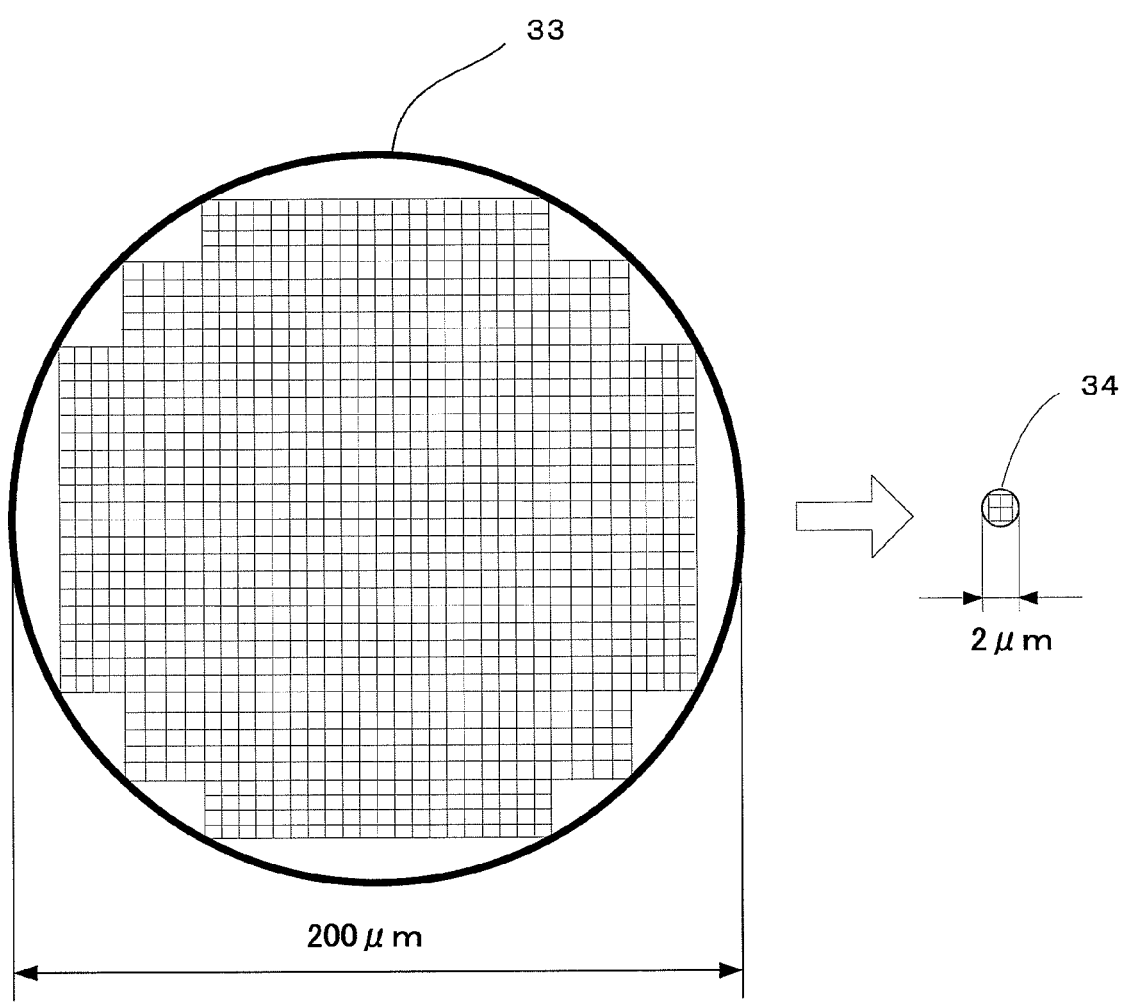
FIG. 3 is a conceptual view showing a conventional recording spot and a recording spot according to the present invention when an information beam and a reference beam are incident.
Figure 4:
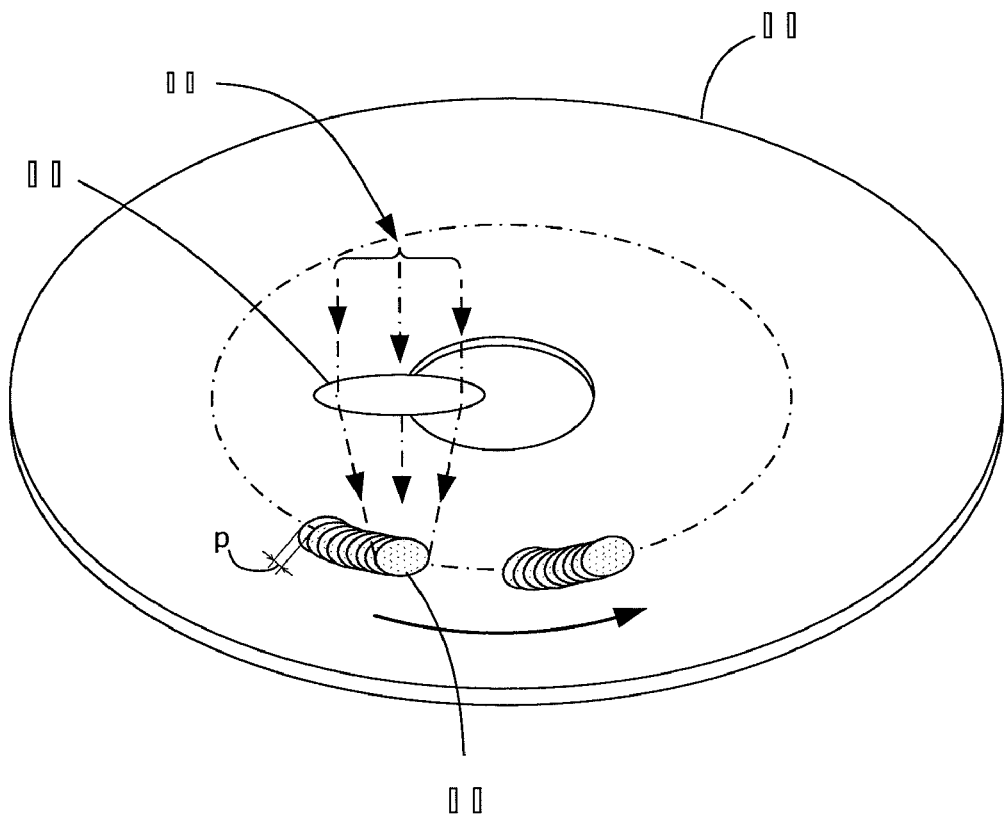
FIG. 4 is a conceptual view showing how the shift-multiplex recording is performed on an optical recording medium.

The information beam consisting of the digital data is transmissive to an object lens, as shown in FIG. 4, and is collected on a recorded region of a recording layer in an optical recording medium 21. Specifically, in the case of the colinear optical recording method, in conventional techniques, an information beam is collected as a recording spot 33 having a diameter of 200 μm or so as shown in FIG. 3, and the recorded region is further irradiated with a reference beam, thereby being recorded on the optical recording layer as interference fringes generated by the information beam and reference beam. The recording spot 33 is formed as a page data pattern consisting of an aggregate of a number of pixels represented by vertical lines and lateral lines by means of the special light modulator. Pixels contained in the recording spot 33, which are the smallest unit of picture elements, are of about one-quarter in size of each of 1,160 squares, as illustrated for convenience in FIG. 3, are actually composed of 4,096 squares, and are represented and recorded as digital data consisting of values of "0" or "1".

However, in order to record such a large volume of information in a single recording spot, a light source with a relatively large capacity is needed, as mentioned above, and a photodetector composed of a large size special light modulator (SLM) capable of processing such a large volume of information of 30,000 bits and a CMOS is needed as well, and thus there is a difficulty in application of the holographic optical recording method to small-size optical systems, like optical systems used for CD and DVD are difficult. In the optical recording method of the present invention, in order to decrease the capacity recorded in a single recording spot and make the light irradiation energy (mJ/cm$^2$) low, as shown in FIG. 3, with respect to the recording spot, the conventional recording spot 33 having a diameter of about 200 μm can be changed to reduce the diameter to, for example, a recording spot 34 having a diameter of 0.01 μm to 100 μm, more preferably 0.05 μm to 50 μm, still more preferably 0.1 μm to 10 μm, and particularly preferably 0.5 μm to 5 μm; and the volume of information stored in the recording spot can be reduced from about 30,000 bits, which is the conventionally used volume, to the range of from 1 bit to 1,024 bits, and preferably to the range of from 4 bits to 256 bits, for example. In this way, the capacity of information stored in a single recording spot and the light irradiation energy can be reduced. When the light irradiation energy for a single recording spot is reduced, a small-size laser like a semiconductor laser capable of continuous oscillation can be utilized, and optical systems including the SLM and photodetector can be replaced with optical systems as small as those used for the current standard of CD and DVD.

The optical recording method is not particularly limited and may be suitably selected according to the purpose, as long as it is a shift-multiplex recording method. For example, transmissive holography or reflective holography may be used. Further, the holographic recording mode is not particularly limited and may be suitably selected from the intended use. For example, it may be an amplitude type hologram, phase-type hologram, brazed hologram and complex amplitude hologram or the like.

<Shift-Multiplex Recording>

In the shift-multiplex recording, as shown in FIG. 4, an information beam and reference beam 39 is collected and irradiated as a recording spot 34 having a given diameter to a predetermined position in a recording layer via an object lens 12 to generate interference fringes attributable to interference of reflected light as well as to record the interference fringes on the recording layer; similarly to the initial record, the second record is recorded so as to be placed on the initial record while slightly moving either irradiation light of the information bean and reference beam or the recording layer along the surface of the recording layer; and additional information is recorded on one after another while further slightly moving either the irradiation light or the recording layer in a sequential manner so that the third record is recorded on the initial record and the second record, and the recorded portions are fixed with a fixing beam or the like.

The interference fringes are composed of fringes of bright sections and dark sections. The bright section causes a photopolymerization reaction of a photosensitive composition in a recording layer to change the composition from a monomer to a polymer, thereby the refractive index is reduced. Then, a difference in refractive index is induced between unreacted portions and the reacted portion, and the interference fringes are recorded as the difference in refractive index. Therefore, the dark sections are unreacted portions on the recording layer, and a bright portion in subsequent recording can be further recorded on the dark sections.

The movement pitch of the irradiation light or the recording layer is preferably the shortest distance at which when the initial record is irradiated with a reproduction beam, an adjacent second record does not react with the reproduction beam.

In the case of the colinear optical recording method in which the information beam and reference beam are irradiated so that the optical axis of the information beam is collinear with that of the reference beam, the space between adjacent records is about 3 μm to 5 μm or more, the reproduction beam does not react with the adjacent records, and thus information or images can be multiply recorded at a space of about 3 μm to 5 μm.

As the pitch becomes smaller, the number of multiplex recording times can be further increased and the recording capacity can also be increased, however, because the diffraction efficiency representing the sharpness of a holographic image to be reproduced is reduced inversely proportional to the number of multiplex recording times, there is a limitation on the number of multiplex recording times.

Further, it is necessary to increase the amount of exposure (mJ/cm$^2$) as the number of multiplex recording times is increased.

When a photopolymer based recording material is used for the recording layer, the initial record can be recorded with low energy, however, when the recording layer is consecutively overlappingly exposed, reacted portions are increased to cause a reduction in sensitivity. Thus, in order to obtain the recording quality as high as that of the initial record, a higher irradiation energy is required. The reasons why the higher irradiation energy is required are that reactions at unreacted portions are restrained by the reacted portions and the unreacted portions are least likely to be reacted; and the amount of the photosensitive composition in the unreacted portions, such as photopolymer, is reduced.

The method of moving either the irradiation light in the shift-multiplex recording is not particularly limited and may be suitably selected in accordance with the purpose. Examples of the moving method include a method of linearly moving irradiation light along the surface of the recording layer; and a method of moving irradiation light along the surface of a disc in the rotational direction of the disc (in a track direction).

Equipment for moving irradiation light in the shift-multiplex recording is not particularly limited and may be suitably selected in accordance with the purpose. For example, tracking servo, DLP (Digital Light Processing) are exemplified.

The movement distance of irradiation light in the shift-multiplex recording is not particularly limited and may be suitably selected in accordance with the purpose, provided that it is a distance at which the reproduction beam does not react with other adjacent records when the reproduction beam is applied to portions to be recorded and reproduced. For example, the distance is preferably 3 μm to 30 μm. When the distance is shorter than 3 μm, the reproduction beam reacts with other adjacent records, which may cause a ghost image. When the distance is longer than 30 μm, the recording capacity as an optical recording medium is reduced, and advantages of the shift-multiple recording may not be exhibited.

<Fixing Beam>

The fixing beam is used to stabilize a recorded interference image which has been recorded on the recording layer.

The irradiation method of the fixing beam is not particularly limited and may be suitably selected in accordance with the purpose. For example, the recording layer may be irradiated, as the fixing beam, with a light beam emitted from the same light source from which the information beam and the reference beam are emitted, and may be irradiated, as the fixing beam, with a light beam emitted from a light source which is difference from the light source for the information beam and reference beam.

(Optical Recording Medium)

The optical recording medium of the present invention is an optical recording medium having on a substrate a recording layer for recording information utilizing holography and suitably selected other layers.

The optical recording medium of the present invention may be any of a relatively thin type planar holographic recording medium for recording information such as dimensional images etc., a volume holographic recording medium for volumetric information such as cubic images, a transmissive recording medium, and a reflective recording medium. The holographic recording mode may be suitably selected. For example, it may be an amplitude type hologram, phase-type hologram, brazed hologram and complex amplitude hologram or the like.

The optical recording medium of the present invention has at least a first substrate, a second substrate, a recording layer on the second substrate, and a filter layer between the second substrate and the recording layer; as the optical recording medium, an optical recording medium used in colinear optical recording method in which the irradiation of the information beam and the reference beam is performed so that the optical axis of the information beam is collinear with that of the reference beam.

<First Substrate>

The first substrate is not particularly limited in terms of its shape, structure, size etc., and can be appropriately selected depending on the intended purpose. Examples of the shape thereof include a disc shape, card shape, plate shape, and sheet shape. Examples of the structure of the first substrate include a single-layer structure and a multilayered structure; and the size thereof can be appropriately set according to the size of the optical recording medium, for example.

The material for the first substrate is not particularly limited and either organic materials or inorganic materials can be suitably used, but should be selected from those which can ensure the physical strength of the optical recording medium. In the case of a transmissive optical recording medium where recording and reproduction beams are incident through the substrate, the first substrate needs to be sufficiently transparent enough to transmit therein such light of desired wavelengths.

Examples of the inorganic materials include glass, quartz and silicon. Among them, glass is preferable in view or accuracy.

Examples of the organic materials include acetate resins such as triacetylcellulose, polyester resins, polyethersulfone resins, polysulfone resins, polycarbonate resins, polyamide resins, polyimide resins, polyolefin resins, acrylic resins, polynorbornene resins, cellulose resins, polyarylate resins, polystyrene resins, polyvinylalcohol resins, polyvinyl chloride resins, polyvinylidene chloride resins, polyacrylic resins, polylactate resins, plastic film laminate paper and synthetic paper. These may be used singularly or in combination. Among these, polycarbonate resins and amorphous polyolefin resins are preferable in light of their formability, optical properties, and costs.

The first substrate may be either a suitably synthesized one or a commercially available one.

The thickness of the first substrate is not particularly limited and can be appropriately set depending on the intended purpose; the thickness is preferably 0.1 mm to 5 mm, more preferably 0.3 mm to 2 mm. If the thickness of the first substrate is less than 0.1 mm, the optical disc may become deformed during storage. If the thickness is greater than 5 mm, the weight of the optical disc increases, so too does the load on a drive motor that spins it.

<Second Substrate>

The second substrate is not particularly limited in terms of its shape, structure, and so on. Examples of the shape of the second substrate include a disc shape and card shape, and material that can ensure the mechanical strength of the resultant optical recording medium needs to be selected. In addition, when recording and reproduction beams are incident through the substrate, the second substrate needs to be transparent enough to transmit such light of desired wavelengths.

For the material of the second substrate, glass, ceramics, resins and the like are generally used; however, resins are most preferable in view of their formability and costs.

Examples of the resins include polycarbonate resins, acrylic resins, epoxy resins, polystyrene resins, acrylonitrile-styrene copolymers, polyethylene resins, polypropylene resins, silicone resins, fluorine resins, ABS resins and urethane resins. Among these, polycarbonate resins and amorphous polyolefin resins are most preferable in view of their formability, optical properties, and costs.

The second substrate may be either a freshly prepared one or a commercially available one.

Multiple numbers of address-servo areas—addressing areas linearly extending in the radial direction of the second substrate—are provided on the substrate at given angles to one another, and each fan-shaped area between adjacent address-servo areas serves as a data area. In the address-servo areas, information for performing a focus servo operation and a tracking servo operation by means of a sampled servo system and address information are previously recorded (or pre-formatted) in the form of emboss pits (servo pits). The focus servo operation can be performed using a reflective surface of the reflective film. For example, wobble pits are used as the information for tracking servo. Note that there is no need to provide the servo pit pattern in a case where the optical recording medium has a card shape.

The thickness of the second substrate is not particularly limited and can be appropriately set depending on the intended purpose; the thickness is preferably 0.1 mm to 5 mm, more preferably 0.3 mm to 2 mm. If the thickness of the substrate is less than 0.1 mm, the optical disc may become deformed during storage. If the thickness is greater than 5 mm, the weight of the optical disc increase, so too does the load on a drive motor that spins it.

The track pitch of the servo pit pattern is not particularly limited and can be appropriately determined depending on the intended purpose. For example, when the wavelength of the servo beam is 620 nm to 700 nm, the track pitch is preferably 0.85 µm to 30 µm, more preferably 1.1 µm to 20 µm, further preferably 1.3 µm to 10 µm, and most preferably 1.5 µm to 2 µm. If the track pitch is less than 0.85 µm, it may result in unstable tracking due to light diffusion in the recording layer. If the track pitch is greater than 30 µm, it may result in reduced recording density.

When the wavelength of the servo beam is 750 nm to 1,000 nm, the track pitch is preferably 1.7 µm to 30 µm, more preferably 1.9 µm to 20 µm, and most preferably 2.3 µm to 5 µm. If the track pitch is less than 1.7 µm, it may result in unstable tracking due to light diffusion in the recording layer. If the track pitch is greater than 30 µm, it may result in reduced recording density.

When the wavelength of the servo beam is 350 nm to 500 nm, the track pitch is preferably 0.4 µm to 30 µm, more preferably 0.6 µm to 20 µm, further preferably 0.8 µm to 5 µm, and most preferably 1 µm to 2 µm. If the track pitch is less than 0.4 µm, it may result in unstable tracking due to light diffusion in the recording layer. If the track pitch is greater than 30 µm, it may result in reduced recording density.

If the wavelength of the servo beam is near 405 nm, the track pitch is preferably 0.32 µm to 0.4 µm.

The groove depth of the servo pit pattern is not particularly limited and can be appropriately determined depending on the intended purpose. For example, suppose that the wavelength of the servo beam is λ, the groove depth is preferably λ/(3n) to λ/(10n), more preferably λ/(4n) to λ/(8n), and further preferably λ/(5n) to λ/(7n), where n is the refractive index of medium constituting pits of the servo pit pattern, i.e., refractive index of the material of pits on the light incident side.

Where λ is 650 nm and n is 1.6, the groove depth is preferably 135 nm to 41 nm. In general, if the value of n somewhat varied, the groove depth is preferably 50 nm to 120 nm, more preferably 60 nm to 110 nm, and most preferably 80 nm to 90 nm when λ is 650 nm. At other wavelengths the groove depth is preferably proportional to wavelength. For example, where the wavelength of the servo beam is 780 nm and n is 1.6, the groove depth is preferably 163 nm to 49 nm. Where the wavelength of the servo beam is 405 nm and n is 1.6, the groove depth is preferably 84 nm to 25 nm.

The groove width of the servo pit pattern is not particularly limited and can be appropriately determined depending on the intended purpose. For example, the groove is preferably wider than those of general CD, DVD, BD, HD, and DVD. More specifically, where the wavelength of the servo beam is 650 nm, the groove width is preferably 0.25 µm to 1.05 µm, more preferably 0.35 µm to 0.95 µm, further preferably 0.45 µm to 0.85 nm, and most preferably 0.55 µm to 0.75 µm.

Where the wavelength of the servo beam is 780 nm, the groove width is preferably 0.45 µm to 2 µm, more preferably 0.6 µm to 1.6 µm, further preferably 0.8 µm to 1.3 µm, and most preferably 1.0 µm to 1.1 µm.

Where the wavelength of the servo beam is 405 nm, the groove width is preferably 0.2 µm to 1.0 µm, more preferably 0.25 µm to 0.8 µm, further preferably 0.3 µm to 0.6 µm, and most preferably 0.35 µm to 0.5 µm.

The angle of the servo pit pattern is not particularly limited and can be appropriately determined depending on the intended purpose. For example, the angle is preferably 25 degree to 90 degree, more preferably 35 degree to 80 degree, further preferably 40 degree to 70 degree, and most preferably 45 degree to 60 degree. Note that if the angle is 90 degree, the pattern shape becomes rectangular.

The wavelength of the servo beam used in a servo area is not particularly limited and may be suitably selected in accordance with the purpose. Specifically, it is preferably within any of the ranges of 350 nm to 500 nm, 620 nm to 700 nm, and 750 nm to 1,000 nm; more preferably within any of the ranges of 390 nm to 440 nm, 640 nm to 690 nm, and 770 nm to 900 nm; still more preferably within any of the ranges of 400 nm to 420 nm, 650 nm to 680 nm, and 780 nm to 830 nm. Among these wavelength ranges, the wavelength range of the servo beam is particularly preferably any one of 405 nm, 650 nm, and 780 nm; and most preferably 405 nm.

—Reflective Film—

The reflective film is formed on the surface of the servo pit pattern of the substrate.

For the material of the reflective film, materials that offer high reflectivity to recording beam and reference beams are preferable. When the wavelength of light to be adopted is 400 nm to 780 nm, Al, Al alloys, Ag, Ag alloys and the like are preferably used. When the wavelength of light to be adopted is 650 nm or more, Al, Al alloys, Ag. Ag alloys, Au, Cu alloys, TiN and the like are preferably used.

With optical recording medium which reflects light by a reflective film and can record or erase information—for example, DVD (Digital Video Disc), directory information indicative of the locations where information has been recorded, the time when information has been recorded, and the locations where errors have occurred and how information has been re-recorded on spare areas can also be recorded on, and erased from the optical recording medium without adversely affecting holograms.

The method for forming the reflective film is not particularly limited and can be appropriately selected depending on the intended purpose; examples thereof include various types of vapor deposition, such as a vacuum vapor deposition, sputtering, plasma CVD, photo CVD, ion plating, and electron beam vapor deposition. Among these, sputtering is most preferable in view of mass productivity, film quality, and the like.

The thickness of the reflective film is preferably 50 nm or more, more preferably 100 nm or more, in order to secure sufficient reflectivity.

<Recording Layer>

For recording layer material, materials that can record information by holography and undergo changes in their optical properties (e.g., absorption index and/or refractive index) upon irradiation with electromagnetic rays (e.g., γ-ray, X-ray, ultraviolet ray, visible light ray, infrared ray, and radio waves) with predetermined wavelength are used.

The recording layer material contains photothermal conversion material, a photosensitive resin, and a binder, and further contains additional component(s) appropriately selected on an as-needed basis.

—Photosensitive Resin—

The photosensitive resin is not particularly limited as long as it is used for holograms and can be appropriately selected depending on the intended purpose. For example, photopolymers are preferable.

—Photopolymer—

The photopolymer is not particularly limited and can be appropriately selected depending on the intended use. For example, the photopolymer contains a monomer and a photoinitiator and further contains additional components such as a sensitizer and/or oligomers on an as-needed basis.

For the photopolymer, for example, those described in the following can be used: "Photopolymer Handbook" (published by Kogyo Chosakai Publishing Inc., 1989), "Photopolymer Technology" (published by THE NIKKAN KOGYO SHIMBUN LTD., 1989), SPIE Journals and Proceedings Vol. 3010 on pp 354-372 (1997), and SPIE Journals and proceedings Vol. 3291 pp 89-103 (1998). In addition, it is also possible to use the photopolymers described in U.S. Pat. Nos. 5,759,721, 4,942,112, 4,959,284, 6,221,536, and 6,743,552; International Publication Nos. WO/97/44714, 97/13183, 99/26112, and 97/13183; Japanese Patent (JP-B) Nos. 2880342, 2873126, 2849021, 3057082, and 3161230; and Japanese Patent Application Laid-Open (JP-A) Nos. 2001-316416 and 2000-275859.

Examples of the method for applying a recording beam to the photopolymer to change the optical properties thereof include a method utilizing diffusion of low-molecular components. In addition, in order to mitigate change in volume of the photopolymer at the time of polymerization, a component that diffuses in the direction opposite to the direction in which polymerized components are diffused may be added, or a compound having a structure that breaks up by treatment with acids may be added in addition to polymers. When the recording layer is formed using a photopolymer containing the low-molecular component, the recording layer may need a structure that can retain liquid therein. Moreover, when the compound having a structure that breaks up by treatment with acids is added, the change in volume of the photopolymer may be constrained by counterbalancing expansion caused by the structure break up and shrinkage caused by polymerization of monomers.

The monomer is not particularly limited can be appropriately selected in depending on the intended use; examples thereof include radical polymerizable monomers having a unsaturated bond such as acrylic group and methacrylic group, and cationic polymerizable monomers having ether structure such as epoxy ring and oxetane ring. Each of these monomers may be monofunctional or polyfunctional. Photocrosslinking monomers may also be used.

The radical polymerizable monomer is not particularly limited and can be appropriately selected depending on the intended use; examples thereof include acryloylmorpholine, phenoxyethylacrylate, isobonylacrylate, 2-hydroxypropylacrylate, 2-ethylhexylacrylate, 1,6-hexanedioldiacrylate, tripopyleneglycol diacrylate, neopentylglycol PO-modified diacrylate, 1,9-nonanedioldiacrylate, hydroxy pivalic acid neopentylglycol diacrylate, EO-modified bisphenol A diacrylate, polyethyleneglycol diacrylate, pentaerythritol triacrylate, pentaerythritol tetraacrylate, pentaerythritol hexaacrylate, EO-modified glycerol triacrylate, trimethylol propane triacrylate, EO-modified trimethylol propane triacrylate, 2-naphtho-1-oxyethyl acrylate, 2-carbazoil-9-ethylacryate, (trimethylsilyloxy) dimethylsilylpropyl acrylate, vinyl-1-naphthoate, N-vinyl carbazole, 2,4,6-tribromophenylacrylate, pentabromoacrylate, phenylthioethylacrylate, and tetrahydrofurfurylacrylate.

Examples of the cationic polymerizable monomer include bisphenol A epoxy resins, phenol novolac epoxy resins, glycerol triglycidyl ether, 1,6-hexane glycidyl ether, vinyltrimethoxysilane, 4-vinylphenyl trimethoxysilane, γ-methacryroxypropyl triethoxysilane, and compounds represented by the following formulas (M1) to (M6). These monomers may be used singularly or in combination.

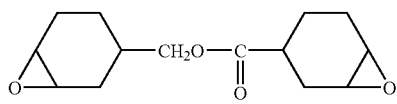

Structural Formula (M1)

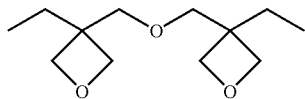

Structural Formula (M2)

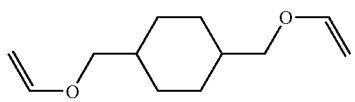

Structural Formula (M3)

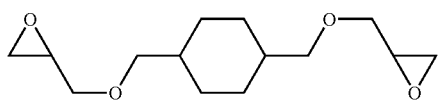

Structural Formula (M4)

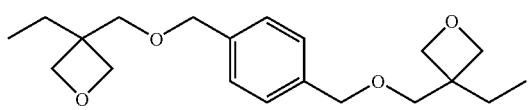

Structural Formula (M5)

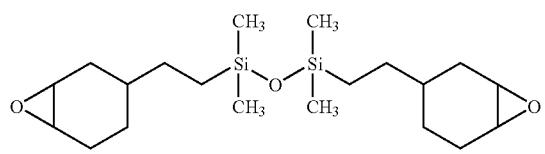

Structural Formula (M6)

The photoinitiator is not particularly limited as long as it is sensitive to a recording beam, and examples thereof include materials that can trigger radical polymerization, cationic polymerization, and crosslinking reactions.

Examples of the photoinitiator include 2,2'-bis(o-chlorophenyl)-4,4',5,5'-tetraphenyl-1,1'-biimidazole, 2,4,6-tris(trichloromethyl)-1,3,5-triazine, 2,4-bis (trichloromethyl)-6-(p-methoxyphenylvinyl)-1,3,5-triazine, diphenyl iodonium tetrafluoroborate, diphenyl iodonium hexafluorophosphate, 4,4'-di-t-butylphenyl iodonium tetrafluoroborate, 4-diethylaminophenylbenzene diazonium hexafluorophotophate, benzoin, 2-hydroxy-2-methyl-1-phenylpropane-2-one, benzophenon, thioxanthone, 2,4,6-trimethyl benzoyl diphenyl acyl phosphine oxide, triphenyl butylborate tetraethylammonium, bis(η-5-2,4-cyclopentadiene-1-yl), bis[2,6-difluoro-3-(1H-pyrrole-1-yl)phenyltitanium], and diphenyl-4-phenylthiophenylsulfonium hexafluorophosphate these photoinitiators may be used singularly or in combination. In addition, sensitizing pigments may be used together with the photoinitiator, depending on the wavelength of beam to be applied.

Polymerization inhibitors and/or antioxidants may be added in order to improve the shelf life of the recording layer. Examples of such Polymerization inhibitors and antioxidants include hydroquinones, p-benzoquinone, hydroquinone monoethylether, 2,6-di-t-butyl-p-cresol, 2,2'-methylenebis (4-methyl-6-t-butylphenol), triphenyl phosphite, trisnonylphenyl phosphite, phenothiazine, and N-isopropyl-N'-phenyl-p-phenylenediamine. The additive amount is 3% by mass or less based on the amount of the total monomers; if it exceeds 3% by mass, the rate of polymerization reactions may be reduced, or polymerization reactions never take place in some cases.

The photopolymer can be obtained by mixing the monomer, the photoinitiator, and other components in accordance with the necessity to allow them to react with one another. When the obtained photopolymer has a substantially low viscosity, it can be formed into a recording layer by casting. If the obtained photopolymer has too high a viscosity to be formed into a recording layer, a recording layer can be formed in the following manner: The photopolymer is deposited on the second substrate using a dispenser, and the first substrate is then pressed against the photopolymer just like putting a lid thereon, whereby the photopolymer is spread over the first substrate to form a recording layer.

Examples of useful photosensitive resins other than the foregoing photopolymers include (1) photorefractive materials that offer a photorefractive effect—an effect that a space-charge distribution is generated as a result of light irradiation, and the refractive index is altered), (2) photochromic materials that undergo changes in refractive index upon irradiation with light, caused by isomerization of their molecules, (3) inorganic materials such as lithium niobate, and barium titanate, and (4) chalcogen materials.

The photorefractive materials (1) are not particularly limited as long as they offer a photorefractive effect, and can be appropriately selected depending on the intended purpose.

For example, the photorefractive materials contain charge generating material and charge transporting material, and further contain additional component(s) on an as-needed basis.

The charge generating material is not particularly limited and can be appropriately selected depending on the intended purpose; examples thereof include phthalocyanine dyes or pigments such as metallophthalocyanine, metal-free phthalocyanine and derivatives thereof; naphthalocyanine dyes or pigments; azo dyes or pigments such as monoazo, disazo and trisazo dyes and pigments; pelylene dyes or pigments; indigo dyes or pigments; quinacridone dyes or pigments; polycyclic quinone dyes or pigments such as anthraquinones, and Anthanthron; cyanine dyes or pigments; charge-transfer complexes contain an electron-accepting substance and an electron-donating substance as typified by TTF-TCNQ; azulenium salts; fullerenes as typified by $C_{60}$ and $C_{70}$ and metanofullerenes, derivatives of fullerenes. These charge generating materials may be used singularly or in combination.

The charge transporting material is material carrying holes or electrons, and may be a low-molecular compound or a high-molecular compound.

The charge transporting material is not particularly limited and can be appropriately selected depending on the intended purpose; examples thereof include nitrogen-containing cyclic compounds such as indoles, carbazoles, oxazoles, inoxazoles, thiazoles, imidazoles, pyrazoles, oxadiazoles, pyrazolines, thiadiazoles and triazoles or derivatives thereof; hydrazoline compounds; triphenyl amines; triphenylmethanes; butadienes; stilbenes; quinone compounds such as anthraquinon diphenoquinons or derivatives thereof; fullerenes such as $C_{60}$ and $C_{70}$ and derivatives thereof; π conjugate high polymers or oligomers such as polyacetylenes, polypyrroles, polythiophenes and polyanilines; a conjugate high polymers or oligomers such as polysilanes and polygermanes; and polycyclic aromatic compounds such as anthracenes, pyrenes, phenanthrenes, and coronenes. These charge transporting materials may be used singularly or in combination.

The following is an example of the method for forming a recording layer using the photorefractive material: a coating solution obtained by dissolving and dispersing the photorefractive material in a solvent is used to prepare a coated film, and the solvent is removed from the coated film to thereby form a recording layer. It is also possible to form a recording layer in the following manner: The photorefractive material is fluidized by heating to prepare a coated film, and the coated film is then quenched to form a recording layer.

The photochromic materials (2) are not particularly limited as long as they can induce a photochromic reaction, and can be appropriately selected depending on the intended use; examples thereof include azobenzene compounds, stilbene compounds, indigo compounds, thioindigo compounds, spiropyran compounds, spirooxazine compounds, fulgide compounds, anthracenes compounds, hydrazone compounds, cinnamic acid compounds and diarylethene compounds. Of these compounds, azobenzene derivatives and stilbene derivatives, which undergo structural changes as a result of cis-trans isomerism upon irradiation with light; and spiropyran derivatives and spirooxazine compounds, which undergo structural changes (ring-opening and ring-closure) upon irradiation with light, are most preferable.

Examples of the chalcogen materials (4) include materials containing chalcogen element-containing chalcogenide glass plus metallic particles which are dispersed in the chalcogenide glass and which can upon irradiation with light diffuse in the chalcogenide glass.

The chalcogenide glass is not particularly limited as long as it is composed of a nonoxide amorphous material containing a chalcogen element such as S, Te, or Se and can be photo-doped with metallic particles.

Preferred examples of amorphous materials containing chalcogen elements include Ge—S glasses, As—S glasses, As—Se glasses and As—Se—Ce glasses. Of these glasses, Ge—S glasses are preferably used. When Ge—S glass is used for the chalcogenide glass, the atomic ratio between Ge and S in the Ge—S glass can be suitably changed depending on the wavelength of light beam to be applied. However, chalcogenide glasses composed primarily of a composition represented by $GeS_2$ are preferably used.

The metallic particles are not particularly limited as long as they can be doped in the chalcogenide glass upon irradiation with light, and can be appropriately selected depending on the intended use; examples thereof include Al, Au, Cu, Cr, Ni, Pt, Sn, In, Pd, Ti, Fe, Ta, W, Zn and Ag. Among these, Ag, Au, and Cu are more likely to be photo-doped in chalogenide glass, and Ag is most preferable because it has excellent photodoping performance.

The amount of the metallic particles dispersed in the chalcogenide glass is preferably 0.1% by volume to 2% by volume, more preferably 0.1% by volume to 1.0% by volume based on the total volume of the recording layer. If the amount of the metallic particles is less than 0.1% by volume, the change in transmittance as a result of photodoping is insufficient, which may result in the reduction in the recording accuracy. Whereas if the amount of the metallic particles is more than 2% by volume, the light transmittance of the recording material decreases, leading to unsatisfactory photodoping in some cases.

—Binder—

The binder is added in order to increase coating capability, strength of the resultant film and holographic recording characteristics, and is appropriately selected in light of its compatibility with hologram material and photothermal conversion material.

The binder is not particularly limited and can be appropriately selected depending on the intended purpose; examples thereon include copolymers of unsaturated acids (e.g., (meth) acrylic acid and itaconic acid) and alkyl (meth)acrylates, phenyl (meth)acrylate, benzyl (meth)acrylate, styrene or α-methylstyrene; polymers of alkyl methacrylates and alkyl acrylates, such as polymethyl methacrylate; copolymers of alkyl (meth)acrylates and acrylonitrile, vinyl chloride, vinylidene chloride or styrene; copolymers of acrylonitrile and vinyl chloride or vinylidene chloride; modified celluloses bearing carboxylic groups on their side chain; polyethyleneoxides; polyvinylpyrrolidones; novolac resins that result from the condensation reaction of phenol, o-cresol, m-cresol, p-cresol and/or xylenol and aldehydes and acetone; polyethers of epichlorohydrin and bisphenol A; soluble nylons; polyvinylidene chloride; chlorinated polyolefins; copolymers of vinyl chloride and vinyl acetate; copolymers of acrylonitrile and styrene; copolymers of acrylonitrile, butadiene and styrene; polyvinylalkylethers; polyvinylalkylketones; polystyrenes; polyurethanes; polyethylene terephthalate isophthalates; acetyl celluloses; acetylpropyloxy celluloses; acetylbutoxy celluloses; nitro celluloses; Celluloid; polyvinyl butyral; epoxy resins; melamine resins; and formalin resins. Note that the term "(meth)acryl" is used in some cases to denote both or either of "acryl" and/or "methacryl."

The amount of the binder in the solids of the recording layer is not particularly limited and can be appropriately set depending on the intended purpose; it is preferably 10% by mass to 95% by mass, more preferably 35% by mass to 90% by mass. If the amount of the binder is less than 10% by mass, interference images may not be obtained stably, whereas if the amount exceeds 95% by mass, it may result in poor diffraction efficiency.

The amount of the binder in the photosensitive layer is preferably 10% by mass to 95% by mass, more preferably 35% by mass to 90% by mass based on the total amount of solids in the photosensitive layer.

—Additional Component Contained in the Recording Layer—

In the present invention it is preferable to add nitro cellulose to the recording layer in order to improve the photothermal conversion effect. Nitro cellulose decomposes under heat generated from a light absorber that has absorbed the near-infrared laser beam, thereby facilitating the polymerization reaction in photopolymers.

The nitrocellulose can be prepared in the following procedure: Natural cellulose purified with a conventional method is esterified with mix acid, and nitro groups are entirely or partially introduced into three hydroxyl groups on the glucopyranose ring, a building block of cellulose. The nitrification degree in the nitrocellulose is preferably 2 to 13, more preferably 10 to 12.5, most preferably 11 to 12.5. Here, the term "nitrification degree" represents percent by weight of nitrogen atoms in nitrocellulose. If the nitrification degree is too high, through the polymerization reaction in the photopolymers is facilitated, it may result in the reduction in room temperature stability. In addition, the resultant nitrocellulose becomes explosive, which is dangerous. If the nitrification degree is too low, the polymerization reaction in the photopolymers is not facilitated well enough.

The degree of polymerization of the nitrocellulose is preferably 20 to 200, more preferably 25 to 150. If the degree of polymerization is too high, it may result in failure to remove the recording layer completely. If the degree of polymerization is too low, coating capability of the recording layer tends to be reduced. The content of the nitrocellulose in the recording layer is preferably 0% by mass to 80% by mass, more preferably 0.5% by mass to 50% by mass, most preferably 1% by mass to 25% by mass based on the total amount of solids in the recording layer.

The recording layer can be formed with a method known in the art. For example, the recording layer can be suitably formed with, for example, the vapor deposition method, wet deposition method, MBE (molecular beam epitaxy) method, cluster ion beam method, molecular lamination method, LB (Langumuir-Blodgett) method, printing method, or transferring method Alternatively, the recording layer may be formed with a two-component urethane matrix formation method described in U.S. Pat. No. 6,743,552.

The formation of the recording layer by means of the wet deposition method can be suitably performed by, for example, using a coating solution obtained by dissolving and dispersing the recording layer material in a solvent, (i.e., by applying the coating solution on a support and drying it). The wet deposition method is not particularly limited and can be appropriately selected from those known in the art depending on the intended use; examples thereof include an ink-jet method, spin coating method, kneader coating method, bar coating method, blade coating method, casting method, dipping method, and curtain coating method.

The thickness of the recording layer is not particularly limited and can be appropriately set depending on the intended purpose; the thickness of the recording layer is preferably 1 μm to 1,000 μm, more preferably 100 μm to 700 μm. If the thickness of the recording layer is within a preferable range, it will result in high S/N ratios even when 10- to 300-fold shift-multiplex recording operation is performed; higher S/N ratios can be obtained in a more preferable thickness range.

<Filter Layer>

The filter layer serves to avoid changes in the wavelength to be selectively reflected even when the incident angle is changed, and has a function to prevent irregular reflection of the information and reference beams at the reflective film of an optical recording medium to thereby prevent the occurrence of noise. Providing such a filter layer on the optical recording medium will lead to high definition and excellent diffraction efficiency.

The filter layer preferably transmits therein a first beam but reflects a second beam having a different wavelength than that of the first beam, wherein the wavelength of the first beam is preferably 350 nm to 600 nm and the wavelength of the second beam is preferably 600 nm to 900 nm. In order for the filter layer to achieve this it is preferable to employ an optical recording medium that includes, in sequence, the recording layer, filter layer and servo pit pattern from the optical system side.

At the incident angle of ±40°, the filter layer preferably has an optical transmittance of 50% or more, more preferably 80% or more for light with a wavelength of 655 nm, and has a reflectivity of 30% or more, more preferably 40% or more for light with a wavelength of 532 nm.

The filter layer is not particularly limited and can be appropriately selected depending on the intended purpose. For example, the filter layer is formed of a dielectric material-deposited layer, a single-layered or multilayered cholesteric liquid crystal layer and, where necessary, additional layer(s). Moreover, the filter layer may have a coloring material-containing layer.

The filter layer may be directly applied and deposited onto the support together with the recording layer. Alternatively, the filter layer may be previously deposited on a base material such as a film to prepare an optical recording medium filter, and the filter may be deposited on the support.

—Dielectric Material-Deposited Layer—

The dielectric material-deposited layer is a laminate of multiple dielectric thin layers with different refraction indices. For the dielectric material-deposited layer to serve as a reflective film through which light of desired wavelength passes, it is preferably a laminate of alternating dielectric thin layers with high and low indices of refraction; however, three or more different dielectric thin layers may be laminated.

The number of the dielectric thin layers to be laminated is preferably 2 to 20, more preferably 2 to 12, still further preferably 4 to 10, most preferably 6 to 8. If the number of the dielectric thin layers to be laminated is greater than 20, it results in the reduction in productivity because of multilayer vapor deposition. The object and effect of the present invention cannot be achieved in some cases.

The order in which the dielectric thin layers are laminated is not particularly limited, and can be appropriately determined depending on the intended purpose. A dielectric thin layer with low refractive index is formed deposited in a case where an adjacent dielectric thin layer has high refractive index. On the other hand, a dielectric thin layer with high refractive index is formed deposited in a case where an adjacent dielectric thin layer has low refractive index. The criteria of refractive index for determining whether a dielectric thin layer has high or low refractive index is preferably set to 1.8; note, however, that this determination is made on an arbitrary basis. That is, dielectric thin layers with different refractive indices equal to or greater than 1.8 (i.e., there are dielectric thin layers with high and low refractive indices) may be used to form such a laminate.

The material for the dielectric thin layer with high refractive index is not particularly limited and can be appropriately selected depending on the intended purpose; examples thereof include $Sb_2O_3$, $Sb_2S_3$, $Bi_2O_3$, $CeO_2$, $CeF_3$, $HfO_2$, $La_2O_3$, $Nd_2O_3$, $Pr_6O_{11}$, $Sc_2O_3$, SiO, $Ta_2O_5$, $TiO_2$, TlCl, $Y_2O_3$, ZnSe, ZnS and $ZrO_2$. Among these, $Bi_2O_3$, $CeO_2$, $CeF_3$, $HfO_2$, SiO, $Ta_2O_5$, $TiO_2$, $Y_2O_3$, ZnSe, ZnS and $ZrO_2$ are preferable, and SiO, $Ta_2O_5$, $TiO_2$, $Y_2O_3$, ZnSe, ZnS and $ZrO_2$ are more preferable.

The material for the dielectric thin layer with low refractive index is not particularly limited and can be appropriately selected depending on the intended purpose; examples thereof include $Al_2O_3$, $BiF_3$, $CaF_2$, $LaF_3$, $PbCl_2$, $PbF_2$, LiF, $MgF_2$, MgO, $NdF_3$, $SiO_2$, $Si_2O_3$, NaF, $ThO_2$ and $ThF_4$. Among these, $Al_2O_3$, $BiF_3$, $CaF_2$, $MgF_2$, MgO, $SiO_2$ and $Si_2O_3$ are preferable, and $Al_2O_3$, $CaF_2$, $MgF_2$, MgO, $SiO_2$ and $Si_2O_3$ are more preferable.

Note that the atomic ratio in the material for the dielectric thin layer is not particularly limited and can be appropriately set depending on the intended purpose. The atomic ratio can be adjusted by changing the concentration of atmosphere's gas upon deposition of dielectric thin layers.

The method for depositing the dielectric thin layer is not particularly limited and can be appropriately selected depending on the intended purpose. For example, a vacuum vapor deposition process such as ion plating and ion beam, a physical vapor deposition (PVD) such as sputtering, and a chemical vapor deposition (CVD) can be used. Among these methods, a vacuum vapor deposition and sputtering are preferable, and sputtering is most preferable.

For the sputtering, DC sputtering is preferable because it offers high deposition rate. Note that highly conductive material is preferably used when DC sputtering is employed.

Examples of the method for depositing multiple dielectric thin layers by sputtering include (1) a single-chamber method, where multiple dielectric thin layers are alternately or sequentially deposited using a single chamber, and (2) a multi-chamber method, where multiple dielectric thin layers are sequentially deposited using multiple chambers. In view of the productivity and to prevent contamination among materials, the multi-chamber method is most preferable.

The thickness of the dielectric thin layer, as expressed in terms of optical wavelength, is preferably $\lambda/16$ to $\lambda$, more preferably $\lambda/8$ to $3\lambda/4$, most preferably $\lambda/6$ to $3\lambda/8$.

—Coloring Material-Containing Layer—

The coloring material-containing layer is formed of a coloring material, a binder resin, a solvent and, where necessary, additional component(s).

Suitable examples of the coloring material include pigments and dyes. Among these, red pigments and red dyes are preferable because they absorb light of wavelength 532 nm and transmit a servo beam of wavelength 655 nm or 780 nm; red pigments are most preferable.

The red dyes are not particularly limited and can be appropriately selected from those known in the art; examples thereof include acidic dyes such as C.I. Acid Reds 1, 8, 13, 14, 18, 26, 27, 35, 37, 42, 52, 82, 87, 89, 92, 97, 106, 111, 114, 115, 134, 186, 249, 254 and 289; basic dyes such as C.I. Basic Reds 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112; and reactive dyes such as C.I Reactive Reds 1, 14, 17, 25, 26, 32, 37, 44, 46, 55, 60, 66, 74, 79, 96 and 97. These dyes may be used singularly or in combination.

The red pigments are not particularly limited and can be appropriately selected from those known in the art; examples thereof include C.I. Pigment Red 9, C.I. Pigment Red 97, C.I. Pigment Red 122, C.I. Pigment Red 123, C.I. Pigment Red 149, C.I. Pigment Red 168, C.I. Pigment Red 177, C.I. Pigment Red 180, C.I. Pigment Red 192, C.I. Pigment Red 209, C.I. Pigment Red 215, C.I. Pigment Red 216, C.I. Pigment Red 217, C.I. Pigment Red 220, C.I. Pigment Red 223, C.I. Pigment Red 224, C.I. Pigment Red 226, C.I. Pigment Red 227, C.I. Pigment Red 228, C.I. Pigment Red 240, C.I. Pigment Red 48:1, Permanent Carmine FBB (C.I. Pigment Red 146), Permanent Ruby FBH (C.I. Pigment Red 11) and Faster Pink B Supra (C.I. Pigment Red 81). These pigments may be used singularly or in combination.

Among these red pigments, those with an optical transmittance of 10% or less for light of wavelength 532 nm and 90% or more for light of wavelength 655 nm are most preferably used.

For the coloring materials, the following organic dye materials are also preferably used.

The organic dye materials are materials that vary color elements of a portion irradiated with the laser beam, and information such as data can be recorded utilizing this variation of color elements.

The organic dye materials are not particularly limited and may be suitably selected in accordance with the purpose. It is preferably an organic dye material containing at least one selected from cyanine dyes, azo dyes, phthalocyanine dyes and oxonol dyes.

More specifically, for example, in the case where a laser beam used in recording has a wavelength of 780 nm, cyanine dyes and phthalocyanine dyes are preferable. When the wavelength is 650 nm, azo dyes and oxonol dyes are preferable. When the wavelength is 405 nm, cyanine dyes and phthalocyanine dyes are preferable.

Specific examples of the oxonol dyes include dyes disclosed in "Heterocyaclic Compounds-Cyanine Dyes and Related Compounds" written by F. M. Harmer, published by John & Wiley & Sons, New York, London in 1964. Among these oxonol dyes, those having a structure represented by the following General Formula (1) are preferable.

General Formula (1)

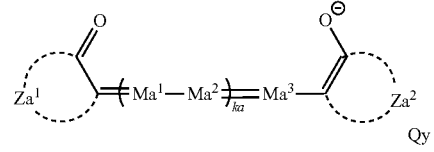

Qy

In General Formula (1), $Za^1$ and $Za^2$ individually represent an atomic group forming an acidic nucleus. Specific examples of the $Za^1$ and $Za^2$ are specified in "The Theory of the Photographic Process, compiled by James—$4^{th}$ edition" (on page 198, published by Macmillan, in 1977).

Specific examples of the $Za^1$ and $Za^2$ include pyrazole-5-one, pyrazolidine-3,5-dione, imidazoline-5-one, hydantoin, 2 or 4-thiohydantoin, 2-iminooxazolidine-4-one, 2-oxazoline-5-one, 2-thiooxazoline-2,4-dione, isorhodanine, rhodanine, 5 or 6 member carbon ring (for example, indan-1,3-dione), thiophene-3-one, thiophene-3-one-1,1-dioxide, indoline-2-one, indoline-3-one, 2-oxoindazolium, 5,7-dioxo-6,7-dihydrothiazolo[3,2-a]pyrimidine, 3,4-hydydroisoquinoline-4-one, 1,3-dioxane-4,6-dione (for example, meldrum acid), barbituric acid, 2-thiobarbituric acid, coumarin-2,4-dione, indazoline-2-one, pyrid[1,2-a]pyrimidine-1,3-dione, pyrazolo[1,5-b]quinazolone, pyrazolopyridone, 3-dicyanomethyldenyl-3-phenylpropionitrile, and nucleus of meldrum acid. Of these, pyrazole-5-one, barbituric acid, 2-thiobarbituric acid, and 1,3-dioxane-4,6-dione are preferable.

In General Formula (1), $Ma^1$, $Ma^2$ and $Ma^3$ individually represent a substituted or an unsubstituted methine group. A substituent substituting one of $Ma^1$, $Ma^2$ and $Ma^3$ is any one of a substituted or an unsubstituted alkyl group, a substituted or an unsubstituted alkoxy group, a substituted or an unsubstituted aryl group, a substituted or an unsubstituted aryloxy group, a substituted or an unsubstituted hetero ring group, a halogen atom, a carboxyl group, a substituted or an unsubstituted alkoxycarbonyl group, a cyano group, a substituted or unsubstituted acyl group, a substituted or an unsubstituted carbamoyl group, an amino group, a substituted amino group, a sulfo group, a hydroxyl group, a nitro group, a substituted or an unsubstituted sulfonylamino group, a substituted or an unsubstituted aminocarbonylamino group, a substituted or an unsubstituted alkylsulfinyl group, a substituted or an unsubstituted arylsulfonyl group, and a substituted or an unsubstituted sulfamoyl group.

For the substituent, substituted or unsubstituted alkyl groups having 1 to 20, substituted or unsubstituted hetero ring groups having 2 to 20 carbon atoms, substituted or unsubstituted alkoxy groups having 1 to 20 carbon atoms, substituted or unsubstituted aryl groups having 6 to 20 carbon atoms, and halogen atom are preferred; substituted or unsubstituted alkyl groups having 1 to 10 carbon atoms, substituted or unsubstituted alkoxy groups having 1 to 10 carbon atoms, substituted or unsubstituted hetero ring groups having 2 to 10 carbon atoms, and halogen atom are more preferred; and unsubstituted alkyl groups having 1 to 5 carbon atoms, unsubstituted alkoxy groups having 1 to 5 carbon atoms, substituted or unsubstituted hetero ring groups having 2 to 6 carbon atoms, and halogen atom are particularly preferred.

As $Ma^1$, $Ma^2$ and $Ma^3$, an unsubstituted methine group, or an unsubstituted alkyl group having 1 to 5 carbon atoms, an unsubstituted alkoxy group having 1 to 5 carbon atoms, a substituted or an unsubstituted hetero ring group having 2 to 6 carbon atoms, and a methine group substituted with halogen atom are preferred.

Further, ka is an integer of 0 to 3, and more preferably an integer of 1 or 2. When ka is 2 or more, $Ma^1$ and $Ma^2$ existing in plural number may be same to each other or different from each other.

In General Formula (1), Q represents an ion neutralizing electric charges; and "y" represents the number of Qs required for the neutralization.

Whether a certain compound is cationic or anionic, or whether the compound has net ionic charges or not depends on the type of a substituent contained in the compound. An ion represented by Q in General Formula (1) sometimes exhibits cationic property and sometimes exhibits anionic property according to charges of dye molecules. Further, when the dye molecules are free of electric charges, Q is not present. The ion represented by Q is not particularly limited and may be an ion from an inorganic compound and may be an ion from an organic compound. The electric charges of the ion represented by Q may be monovalent and may be multivalent.

Examples of cations represented by Q include metal ions such as sodium ion, potassium ion; quaternary ammonium ions, oxonium ions, sulfonium ions, phosphonium ions, selenonium ions, and onium ions such as iodonium ion.

Meanwhile, anions represented by Q include halogen anions such as chloride ions, bromide ions, and fluoride ions; heteropoly acid ions such as sulfate ion, phosphate ion, and hydrogen phosphate ion; and organic polyvalent anions such as succinate ion, maleate ions, fumarate ions, aromatic disulfonate ions; borate tetrafluoride ions, and phosphate hexafluoride ions.

As the cations represented by Q, onium ions are preferred, and quaternary ammonium ions are more preferred. Among quaternary ammonium ions, 4,4'-bipyridinium cation represented by General Formula (I-4) in Japanese Patent Application Laid-Open (JP-A) No. 2000-52658, and 4,4'-bipyridinium cation disclosed in Japanese Patent Application Laid-Open (JP-A) No. 2002-59652 are more preferred.

Among dyes represented by General Formula (1), the ion represented by Q is preferably the one having a structure represented by the following General Formula (2).

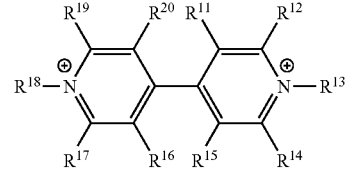

General Formula (2)

In General Formula (2), $R^{11}$, $R^{12}$, $R^{14}$, $R^{15}$, $R^{16}$, $R^{17}$, $R^{19}$ and $R^{20}$ individually represent a hydrogen atom or a monovalent substituent; and $R^{13}$ and $R^{18}$ individually represent a monovalent substituent.

Examples of the monovalent substituent include halogen atom, alkyl groups (including cycloalkyl group, and bicycloalkyl group), alkenyl groups (including cycloalkenyl group, and bicycloalkenyl group), alkynyl groups, aryl groups, hetero ring groups, cyano groups, hydroxyl groups, nitro groups, carboxyl groups, alkoxy groups, aryloxy groups, silyloxy groups, hetero ring oxy groups, acyloxy groups, carbamoyloxy groups, alkoxycarbonyloxy groups, aryloxycabonyloxy groups, amino groups (including anilino group), acylamino groups, aminocarbonylamino groups, alkoxycarbonylamino groups, aryloxycarbonylamino groups, sulfamoylamino groups, alkyl or aryl sulfonylamino groups, mercapto groups, alkylthio groups, arylthio groups, hetero ring thio groups, sulfamoyl groups, sulfo groups, alkyl or aryl sulphinyl groups, alkyl or aryl sulfonyl group, acyl groups, aryloxycarbonyl groups, alkoxycarbonyl groups, carbamoyl groups, aryl or hetero ring azo groups, imide groups, phosphino groups, phosphinyl groups, phosphinyloxy groups, phosphinylamino groups, and silyl groups.

Oxonol dyes represented by General Formula (1) may be used alone or in combination. Further, dye compounds other than the above-mentioned oxonol dyes may be used in combination. As the dyes used in combination with the oxonol dyes, azo dyes (including compounds complexed with metal ion), pyrromethene dyes, and cyanine dyes.

The thermal decomposition temperature of a dye used for the organic dye material is preferably within the range of 100 to 350, more preferably within the range of 150 to 300, and most preferably within the range of 200 to 300.

In view of optical properties of amorphous films composed of the dyes ("the above-mentioned oxonol dye" or "the above-mentioned oxonol dye and dyes to be used in combination therewith"), a coefficient of complex refractive index "n" (real part: refractive index), and "k" (imaginary part: attenuation coefficient) are preferably, respectively, $2.0 \leq n \leq 3.0$, and $0.005 \leq k \leq 0.30$; more preferably $2.1 \leq n \leq 2.7$, and $0.01 \leq k \leq 0.15$; and most preferably $2.15 \leq n \leq 2.50$, and $0.03 \leq k \leq 0.10$.

The amount of the coloring material is preferably 0.05% by mass to 90% by mass, more preferably 0.1% by mass to 70% by mass based on the total amount of the solids of the coloring material-containing layer. If the amount of the coloring material is less than 0.05% by mass, the thickness of the coloring material-containing layer may need to be set to 500 µm or more. If the amount of the coloring material is greater than 90% by mass, the coloring material-containing layer may collapse during its preparation due to lack of self-supporting properties.

The binder resin in the coloring material-containing layer is not particularly limited and can be appropriately selected from those known in the art; examples thereof include polyvinylalcohol resins; vinyl chloride/vinyl acetate copolymers; copolymers of vinyl chloride or vinyl alcohol and at least one of malleic acid and acrylic acid; vinyl chloride/vinylidene chloride copolymers; vinyl chloride/acrylonitrile copolymers; ethylene/vinyl acetate copolymers; celluloses derivatives such as nitrocellulose resins; polyacrylic resins; polyvinylacetal resins; polyvinylbutyral resins; epoxy resins; phenoxy resins; polyurethane resins; and polycarbonate resins. These materials can be used singularly or in combination.

In addition, polar groups (e.g., epoxy group, $CO_2H$, OH, $NH_2$, $SO_3M$, $OSO_3M$, $PO_3M_2$, and $OPO_3M_2$, where M represents a hydrogen atom, alkali metal, or ammonium and if two or more Ms appear, they may be different) are preferably introduced into the molecules of the above-listed binder resins in order to increase their dispersibility and durability. The amount of such polar groups is preferably $10^{-6}$ to $10^{-4}$ equivalents per gram of binder resin. The binder resins are preferably cured by the addition of a known isocyanate crosslinking agent.

The amount of the binder resin is preferably 10% by mass to 99.95% by mass, more preferably 30% by mass to 99.9% by mass based on the total amount of the solids of the coloring material-containing material.

Each of these components described above is dissolved or dispersed in a suitable solvent to prepare a coating solution, and the coating solution is applied over a substrate to be described later using a desired coating method. In this way a coloring material-containing layer can formed.

The solvent is not particularly limited and can be appropriately selected from those known in the art; examples thereof include water; alkoxypropionic acid esters such as 3-methoxypropionic acid methylester, 3-methoxypropionic acid ethylester, 3-methoxypropionic acid propylester, 3-ethoxypropionic acid methylester, 3-ethoxypropionic acid ethylester and 3-ethoxypropionic acid propylester; alkoxy alcohol esters such as 2-methoxypropylacetate, 2-ethoxypropylacetate and 3-methoxybutylacetate; lactic acid esters such as methyl lactate and ethyl lactate; ketones such as methyl ethyl ketone, cyclohexanone and methylcyclohexanone; γ-butyrolactone; N-methylpyrrolidone; dimethylsulfoxide; chloroform; and tetrahydrofuran. These solvents may be used singularly or in combination.

The coating method is not particularly limited and can be appropriately selected from those known in the art depending on the intended use; examples thereof include an ink-jet method, spin coating method, kneader coating method, bar coating method, blade coating method, casting method, dipping method, and curtain coating method.

The thickness of the coloring material-containing layer is preferably 0.5 µm to 200 µm, more preferably 1.0 µm to 100 µm, for example. If the thickness of the coloring material-containing layer is less than 0.5 µm, binder resin that encapsulates coloring material to form a film cannot be added in sufficient amounts in some cases. If the thickness of the coloring material-containing layer is greater than 200 µm, the resultant filter is made too thick, thus requiring a big optical system for an irradiating beam and servo beam in some cases.

<Cholesteric Liquid Crystal Layer>

The cholesteric liquid crystal layer contains at least cholesterol derivative, a nematic liquid crystal compound and a chiral compound, and further contains a polymerizable monomer and, where necessary, additional component(s)

The cholesteric liquid crystal layer may be either a single-layered cholesteric liquid crystal layer or a multilayered cholesteric liquid crystal layer.

The cholesteric liquid crystal layer preferably has a circularly polarizing function. The cholesteric liquid crystal layer selectively reflects light components which have been circularly polarized in the direction in which the liquid crystal helix rotates (i.e., to the right or left) and which have a wavelength that equals to the pitch of the liquid crystal helix. The cholesteric liquid crystal layer utilizes selective reflection characteristics to separate a particular circularly polarized component with a particular wavelength from natural light composed of light components of different wavelengths, and reflects the other light components.

The optical recording medium filter preferably has a refractivity of 40% or more for light of a wavelength range of $\lambda_0$ to $\lambda_0/\cos 20°$ (where $\lambda_0$ represents the wavelength of irradiation light), incident at an angle of ±20° (measured from the normal of the surface of the recording layer when the light is applied perpendicularly thereto is 0°). Most preferably, the optical recording medium filter has a reflectivity of 40% or more for light of a wavelength range of $\lambda_0$ to $\lambda_0/\cos 40°$ (where $\lambda_0$ represents the wavelength of irradiation light) incident at an angle of ±40° (measured from the normal of the surface of the recording layer when the light is applied perpendicularly thereto is 0°). If the optical reflectivity is 40% or more for light of a wavelength range of $\lambda_0$ to $\lambda_0/\cos 20°$, especially $\lambda_0$ to $\lambda_0/\cos 40°$ (where $\lambda_0$ represents the wavelength of irradiation light), it is made possible to eliminate the dependency of reflectivity on incident angle and to adopt optical lens system that is used for general optical recording media. To achieve this it is preferable that the selectively-reflecting wavelength range of the cholesteric liquid crystal layer be wide.

More specifically, when a single-layer cholesteric liquid crystal layer is used, the selectively-reflecting wavelength range Δλ is expressed by the following Equation (1). Thus, it is preferable to employ liquid crystals with a large value of (ne–no).

$$\Delta\lambda = 2\lambda(ne-no)/(ne+no) \qquad \text{Equation (1)}$$

where "no" represents the refractive index of the nematic liquid crystal molecules for normal light, contained in the cholesteric liquid crystal layer, "ne" represents the refractive index of the nematic liquid crystal molecules for abnormal light, and λ represents the central selective light reflection wavelength.

Moreover, as shown in JP-A No. 2004-352081, it is preferable to use an optical recording medium filter in which the helical pitch continuously changes in the thickness direction of the liquid crystal layers, which is achieved by employing as a chiral compound a photo-reactive chiral compound that is photosensitive and that can greatly change the helical pitch of liquid crystals by irradiation with light and by adjusting the photo-reactive chiral compound content and UV irradiation time.

In the case of a multilayered cholesteric liquid crystal layer, it is preferable to laminate cholesteric liquid crystal layers with different values of the central selective light reflection wavelength and where the director axis of cholesteric liquid crystal molecules in the layers rotates in the same direction.

The cholesteric liquid crystal layer is not particularly limited as long as it has the above characteristics and can be appropriately selected depending on the intended purpose. As described above, the cholesteric liquid crystal layer contains a nematic liquid crystal compound and a chiral compound, further contains a polymerizable monomer and, where necessary, further contains additional component(s).

—Nematic Liquid Crystal Compound—

The nematic liquid crystal compound features that its liquid crystal phase is immobilized at the liquid crystal phase transition temperature or lower. The nematic liquid crystal compound is appropriately selected from liquid crystal compounds having an anisotropy refractive index $\Delta n$ of 0.10-0.40, high molecular liquid crystal compounds, and polymerizable liquid crystal compounds. The nematic liquid crystal compound can be used as a solid phase, by aligning while in the liquid crystal state by means of an alignment plate subjected to the rubbing treatment, and then cooling for immobilization.

The nematic liquid crystal compounds are not particularly limited and can be appropriately selected depending on the intended purpose; nematic liquid crystal compound having polymerizable group in their molecular structure are preferable in order to ensure curability. Among them, UV polymerizable liquid crystals are suitable. The UV polymerizable liquid crystals may be selected from the commercially available products, and examples thereof include PALIOCOLOR LC242 manufactured by BASF AG, E7 [product name] manufactured by Merck & Co., Inc., LC-Silicon-CC3767 manufactured by Wacker-Chemie AG, and L35, L42, L55, L59, L63, L79 and L83 manufactured by Takasago International Corp.

The amount of the nematic liquid crystal compound is preferably 30% by mass to 99% by mass, and more preferably 50% by mass to 99% based on the total amount of the solids of the cholesteric liquid crystal layer. If the amount is less than 30% by mass, alignment of molecules of the nematic liquid crystal compound may become insufficient.

—Chiral Compound—

The chiral compounds are not particularly limited and can be appropriately selected from the known compounds depending on the intended purpose. Examples are isomannide compounds, catechin compounds, isosorbide compounds, fenchone compounds, and carbon compounds in view of improving hue and color purity of the liquid crystal compound. These may be used singularly or in combination. The chiral compound may be selected from the commercially available products, and examples thereof include S101, R811 and CB15 manufactured by Merck & Co., Inc., and PALIO-COLOR LC756 manufactured by BASF.

The amount of the chiral compound is preferably 0% by mass to 30% by mass, and more preferably 0% by mass to 20% by mass based on the total amount of the solids of the cholesteric liquid crystal layer. In the case where the content is more than 30% by mass, alignment of molecules in the cholesteric crystal layer may become insufficient.

—Polymerizable Monomer—

The cholesteric liquid crystal layer optionally contains a polymerizable monomer, for example, for the purpose of improve a curing degree such as a film strength. For example, after irradiating light so as to change (to pattern) the spiral of the liquid crystal, e.g., forming a distribution of the selective reflection wavelength, the spiral structure (selective reflection property) thereof is fixed. By adding the polymerizable monomer in the cholesteric liquid crystal layer, the strength of the fixed cholesteric liquid crystal layer is improved. In the case where the liquid crystal compound has a polymerizable group in its molecular structure, it is however not necessary to add the polymerizable monomer.

The polymerizable monomer is not particularly limited, and can be appropriately selected from the known monomers depending on the intended purpose. Examples thereof include monomers having ethylenically unsaturated bonds therein. Specific examples thereof include polyfunctional monomers such as pentaerythritol tetraacrylate, and dipentaerythritol hexaacrylate. These may be used singularly or in combination.

The additive amount of the polymerizable monomer is preferably 0% by mass to 50% by mass, and more preferably 1% by mass to 20% by mass based on the total amount of the solids of the cholesteric liquid crystal layer. If the amount is more than 50% by mass, alignment of molecules of the cholesteric liquid crystal layer may be inhibited.

—Additional Components—

The aforementioned additional components are not particularly limited, and can be appropriately selected depending on the intended purpose. Examples thereof include photopolymerization initiators, sensitizers, binder resins, polymerization inhibitors, solvents, surfactants, thickeners, dyes, pigments, UV absorbers, and gelling agents.

The photopolymerization initiator is not particularly limited, and can be appropriately selected from the known products depending on the intended purpose. Examples thereof include p-methoxyphenyl-2,4-bis(trichloromethyl)-s-triazine, 2-(p-buthoxystyryl)-5-trichloromethyl-1,3,4-oxadiazole, 9-phenylacridine, 9,10-dimethylbenzphenazine, benzophenone and Michler's ketone mixture, hexaarylbiimidazole and mercaptobenzoimidazole mixture, and benzyldimethylketal, thioxanthone and amine mixtures are available. They may be used singularly or in combination.

The photopolymerization initiator may be selected from commercially available products. Examples thereof include IRGACUREs 907, 369, 784, and 814 manufactured by Ciba Specialty Chemicals KK, and Lucirin TPO manufactured by BASF.

The additive amount of the photopolymerization initiator is preferably 0.1% by mass to 20% by mass, and more preferably 0.5% by mass to 5% by mass based on the total amount of the solids of the cholesteric crystal liquid layer. If the amount is less than 0.1% by mass, it may take a long time to cure at the time of radiation since the curing efficiency is low. If the amount is more than 20% by mass, light transmittance becomes low from the ultraviolet light range to the visible light range.

The sensitizer is added on an as-needed basis in order to increase the degree of cure in the cholesteric liquid crystal layer.

The sensitizer is not particularly limited and can be appropriately selected from those known in the art; examples thereof include diethylthioxanthone and isopropylthioxanthone.

The additive amount of the sensitizer is preferably 0.001% by mass to 1.0% by mass based on the total amount of the solids in the cholesteric liquid crystal layer.

The binder resin is not particularly limited and can be appropriately selected from those known in the art; examples thereof include polyvinyl alcohols; polystyrene compounds such as polystyrene and poly-α-methylstyrene; cellulose resins such as methylcellulose, ethylcellulose and acetylcellulose; acid cellulose derivatives bearing carboxylic groups on their side chains; acetal resins such as polyvinyl formal and polyvinyl butyral; methacrylic acid copolymers; acrylic acid copolymers; itaconic acid copolymers; crotonic acid copolymers; maleic acid copolymers; partially-esterified maleic acid copolymers; homopolymers of acrylic acid alkylesters or homopolymers of methacrylic acid alkyl esters; and polymers with additional hydroxyl groups. These binder resins may be used singularly or in combination.

Examples of alkyl groups in the homopolymers of acrylic acid alkylesters or homopolymers of methacrylic acid alkyl esters include methyl group, ethyl group, n-propyl group, n-butyl group, iso-butyl group, n-hexyl group, cyclohexyl group and 2-ethylhexyl group.

Examples of the polymers with additional hydroxyl groups include benzyl(meth)acrylate/(homopolymers of methacrylic acid) acrylic acid copolymers, and multicomponent copolymers of benzyl(meth)acrylate/(meth)acrylic acid/ other monomers.

The additive amount of the binder resin is preferably 0% by mass to 80% by mass, more preferably 0% by mass to 50% by mass based on the total amount of the solids in the cholesteric liquid crystal layer. If the additive amount of the polymerizable monomers is greater than 80% by mass, it may result in poor alignment of cholesteric liquid crystal molecules.

The polymerization inhibitor is not particularly limited and can be appropriately selected depending on the intended purpose; examples thereof include hydroquinones, hydroquinone monoethylethers, phenothiazines, benzoquinones and derivatives thereof.

The additive amount of the polymerization inhibitor is preferably 0% by mass to 10% by mass, more preferably 100 ppm to 1% by mass based on the amount of the solids in the polymerizable monomer.

The solvent is not particularly limited and can be appropriately selected from those known in the art; examples thereof include alkoxypropionic acid esters such as 3-methoxypropionic acid methylester, 3-methoxypropionic acid ethylester, 3-methoxypropionic acid propylester, 3-ethoxypropionic acid methylester, 3-ethoxypropionic acid ethylester and 3-ethoxypropionic acid propylester; alkoxy alcohol esters such as 2-methoxypropylacetate, 2-ethoxypropylacetate and 3-methoxybutylacetate; lactic acid esters such as methyl lactate and ethyl lactate; ketones such as methyl ethyl ketone, cyclohexanone and methylcyclohexanone; γ-butyrolactone; N-methylpyrrolidone; dimethylsulfoxide; chloroform; and tetrahydrofuran. These solvents may be used singularly or in combination.

The cholesteric liquid crystal layer can be formed in the following procedure: For example, a coating solution for cholesteric liquid crystal layer prepared by use of the above solvent is applied on the base material (note that this coating solution is prepared for each liquid crystal layer in the case of a multilayered cholesteric liquid crystal layer). Thereafter, the coating solution is dried, and cured by irradiating it with ultraviolet light.

For mass production, the cholesteric liquid crystal layer can be formed in the following procedure: The base material is previously wound in a roll shape, and the coating solution is then applied on the base material using a long, continuous coater such as a bar coater, die coater, blade coater, or curtain coater.

Examples of the coating method include a spin coating method, casting method, roll coating method, flow coating method, printing method, dip coating method, casting deposition method, bar coating method and gravure printing method.

The UV irradiation condition is not particularly limited and can be appropriately determined depending on the intended purpose; the wavelength of UV light to be applied is preferably 160 nm to 380 nm, more preferably 250 nm to 380 nm; irradiation time is preferably 0.1 seconds to 600 seconds, more preferably 0.3 second to 300 seconds. By adjusting the UV irradiation condition, it is possible change the helical pitch of the cholesteric liquid crystals continuously in the thickness direction of the liquid crystal layer.

It is also possible to add an ultraviolet absorber to the cholesteric liquid crystal layer in order to adjust the UV irradiation condition. The ultraviolet absorber is not particularly limited and can be appropriately selected depending on the intended purpose; suitable examples thereof include benzophenone ultraviolet absorbers, benzotriazole ultraviolet absorbers, salicylic acid ultraviolet absorbers, cyanoacrylate ultraviolet absorbers and oxalic acid anilide ultraviolet absorbers. Specific examples of these ultraviolet absorbers are disclosed in JP-A Nos. 47-10537, 58-111942, 58-212844, 59-19945, 59-46646, 59-109055 and 63-53544; Japanese Patent Application Publication (JP-B) Nos. 36-10466, 42-26187, 48-30492, 48-31255, 48-41572 and 48-54965, 50-10726; and U.S. Pat. Nos. 2,719,086, 3,707,375, 3,754,919 and 4,220,711.

In the case of a multilayered cholesteric liquid crystal layer, the thickness of each cholesteric liquid crystal layer is preferably 1 μm to 10 μm, more preferably 2 μm to 7 μm. If the thickness of the cholesteric liquid crystal layer is less than 1 μm, it results in poor selective reflectivity. If the thickness of the cholesteric liquid crystal layer is greater than 10 μm, uniformly aligned liquid crystal molecules in the cholesteric liquid crystal layer may orient in random directions.

The total thickness of the cholesteric liquid crystal layers in a multilayered cholesteric liquid crystal layer (or the thickness of single cholesteric layer in the case of a single-layered liquid crystal layer) is preferably 1 μm to 30 μm, more preferably 3 μm to 10 μm.

—Manufacturing Method for an Optical Recording Medium Filter which has a Cholesteric Liquid Crystal Layer—

The manufacturing method for the filter is not particularly limited and can be appropriately selected depending on the intended purpose.

The optical recording medium filter is not particularly limited and can be appropriately selected depending on the intended purpose. It is preferable that the filter be formed into a disc shape (e.g., by stamping) together with a base material and subsequently be placed onto the second substrate of the optical recording medium. If the filter is used for a filter layer for optical recording media, it can be directly provided on the second substrate without interposing a base material therebetween.

<Base Material>

The base material is not particularly limited and can be appropriately selected depending on the intended purpose. For example, the base material may be either a freshly prepared one or a commercially available one.

The thickness of the base material is not particularly limited and can be appropriately set depending on the intended purpose; the thickness is preferably 10 μm to 500 μm, more preferably 50 μm to 300 μm. If the thickness of the base material is less than 10 μm, the substrate bends and thus its adhesion properties with other components are reduced. If the thickness of the base material is greater than 500 μm, the focus of information light needs to be shifted by a large amount from the focus of reference light, leading to the necessity of preparing a big optical system. For bonding films through which light of desired wavelength passes, known adhesives can be used in any combination.

The agglutinant is not particularly limited and can be appropriately selected depending on the intended purpose; examples thereof include rubber agglutinants, acrylic agglutinants, silicone agglutinants, urethane agglutinants, vinylalkyl ether agglutinants, polyvinylalcohol agglutinants, polyvinylpyrrolidone agglutinants, polyacrylamide agglutinants and cellulose agglutinants.

The thickness of the adhesive or agglutinant applied is not particularly limited and can be appropriately set depending on the intended purpose. In the case of adhesive, the thickness is preferably 0.1 μm to 10 μm, more preferably 0.1 μm to 5 μm in light of the optical properties and slimness. In the case of agglutinant, the thickness is preferably 1 μm to 50 μm, more preferably 2 μm to 30 μm.

Note, however, that it is possible to directly form the filter layer on the substrate depending on the circumstances.

<Additional Layer>

The additional layer is not particularly limited and can be appropriately selected depending on the intended purpose; examples thereof include a first gap layer, second gap layer, antireflection layer, and protective layer.

—First Gap Layer—

The first gap layer is provided between the filter layer and the reflective film on an as-needed basis for smoothing the surface of the second substrate. Moreover, the first gap layer is effective to adjust the size of holograms formed in the recording layer. Specifically, since somewhat large regions where optical interference between an information beam and recording reference beam takes place need to be secured in the recording layer, it is effective to provide the first gap layer between the recording layer and the servo pit pattern.

The first gap layer can be formed by, for example, applying UV curable resin or the like on the servo pit pattern by spin coating or the like and by curing the resin. In addition, when a filter layer is formed on a transparent base material, the transparent base material also serves as the first gap layer.

The thickness of the first gap layer is not particularly limited and can be appropriately set depending on the intended purpose; the thickness is preferably 1 μm to 200 μm.

—Second Gap Layer—

The second gap layer is provided between the recording layer and the filter layer on an as-needed basis.

The material for the second gap layer is not particularly limited and can be appropriately selected depending on the intended purpose; examples thereof include transparent resin films such as triacetylcellulose (TAC), polycarbonate (PC), polyethylene terephthalate (PET), polystyrene (PS), polysulfone (PSF), polyvinylalcohol (PVA) and methyl polymethacrylate (PMMA); norbornene resin films such as ARTON (from JSR Corp.), ZEONOA (from Nippon Zeon). Among these, those with high isotropy are preferable, and TAC, PC, ARTON and ZEONOA are most preferable.

The thickness of the second gap layer is not particularly limited and can be appropriately set depending on the intended purpose; the thickness is preferably 1 μm to 200 μm.

—Protective Layer—

The protective layer is used for the purpose of (1) protecting the dye-containing recording layer from scratches, dusts, and smears, (2) increasing the shelf stability of the dye-containing recording layer, (3) increasing the reflectivity, and so forth. The protective layer is made of either inorganic material or organic material. As the inorganic material, for example, SiO and $SiO_2$ can also be employed. As the organic material, for example, heat-softening resins, heat-melting resins and UV curable resins can also be used, such as polymethacrylate resins, polycarbonate resins, epoxy resins, polystyrene resins, polyester resins, vinyl resins, celluloses, aliphatic hydrocarbon resins, aromatic hydrocarbon resins, natural rubbers, styrene-butadiene resins, chloroprene rubbers, waxes, alkyd resins, drying oils, and rosins. Among them, UV curable resins are most preferable in view of their high productivity.

Where necessary, the protective layer may further contain a stabilizer, dispersant, fire retardant, lubricant, antistatic agent, surfactant, and/or plasticizer, for example.

The thickness of the protective layer is not particularly limited and can be appropriately set depending on the intended purpose; it is preferably 0.01 μm to 30 μm, more preferably 0.05 μm to 10 μm.

(Manufacturing Method for Optical Recording Medium)

The manufacturing method for optical recording medium used in the present invention is not particularly limited and can be appropriately selected depending on the intended purpose. The manufacturing method includes, for example, a composition preparing step, recording layer disposing step, filter layer forming step, first gap layer forming step, and laminate forming step and, where necessary, further includes additional step(s) appropriately selected.

<Composition Preparing Step>

The composition preparing step is a step of preparing an optical recording composition, wherein a composition that contains a photopolymer consisting of a monomer, photoinitiator, sensitizer, oligomer, binder, and optional additional component appropriately selected on an as-needed basis is dissolved, dispersed, and mixed with a solvent. The preparation is carried out in a dry, low-temperature environment, e.g., at a temperature of 23° C. and humidity of 10%.

<Recording Layer Disposing Step>

The recording layer disposing step is a step of disposing on the filter layer, or on the second gap layer in a case where it is provided on the filter layer, a recording layer for recording information by holography. In this step the optical recording composition prepared in the composition preparing step is applied with a coating method or the like.

The method of disposing the recording layer is not particularly limited and can be appropriately selected depending on the intended purpose. For example, wet deposition method or injection method can be employed. The wet deposition method forms a recording layer by using a solution (coating solution) obtained by dissolving and dispersing the recording layer material in a solvent (i.e., by applying the coating solution on a support and drying it). The wet deposition method is not particularly limited and can be appropriately selected from those known in the art depending on the intended use; examples thereof include an inkjet method, spin coating method, kneader coating method, bar coating method, blade coating method, casting method, dipping method, and curtain coating method.

The injection method injects a recording layer solution in a space between the first and second substrates. A disc cell is fabricated before hand by sandwiching outer circumferential and inner circumferential spacers between the first and second substrates. A portion of the outer circumferential space is notched, and a recording layer solution is injected though the notch.

The injection method is not particularly limited and can be appropriately selected depending on the intended purpose; examples thereof include outer circumference injection method, inner circumference injection method, and gap injection method.

For example, the injection conditions are as follows: Temperature=23° C.; viscosity=330 mPa·s; pressure=0.5M; humidity=10%; curing time=40 min at 80° C.

The injection device is not particularly limited and can be appropriately selected depending on the intended purpose; examples thereof include a syringe and a compressed air dispenser.

The thickness of the recording layer is not particularly limited and can be appropriately set depending on the intended purpose; it is preferably 1 μm to 1,000 μm, more preferably 100 μm to 700 μm.

If the recording layer thickness falls within the above preferable range, sufficient S/N ratios can be obtained even in the case of shift multiplex (10-300 fold). If the recording layer thickness falls within the above more preferable range, the effect of increasing S/N ratios is more remarkable.

—Outer Circumferential Spacer—

The shape of the outer circumferential spacer is not particularly limited as long as it is substantially identical to the outer circumferential shape of optical recording medium, and can be appropriately selected depending on the intended purpose; examples thereof include quadrangle, circle, ellipse, and polygon. Among these, circle is preferable.

Figure 6:
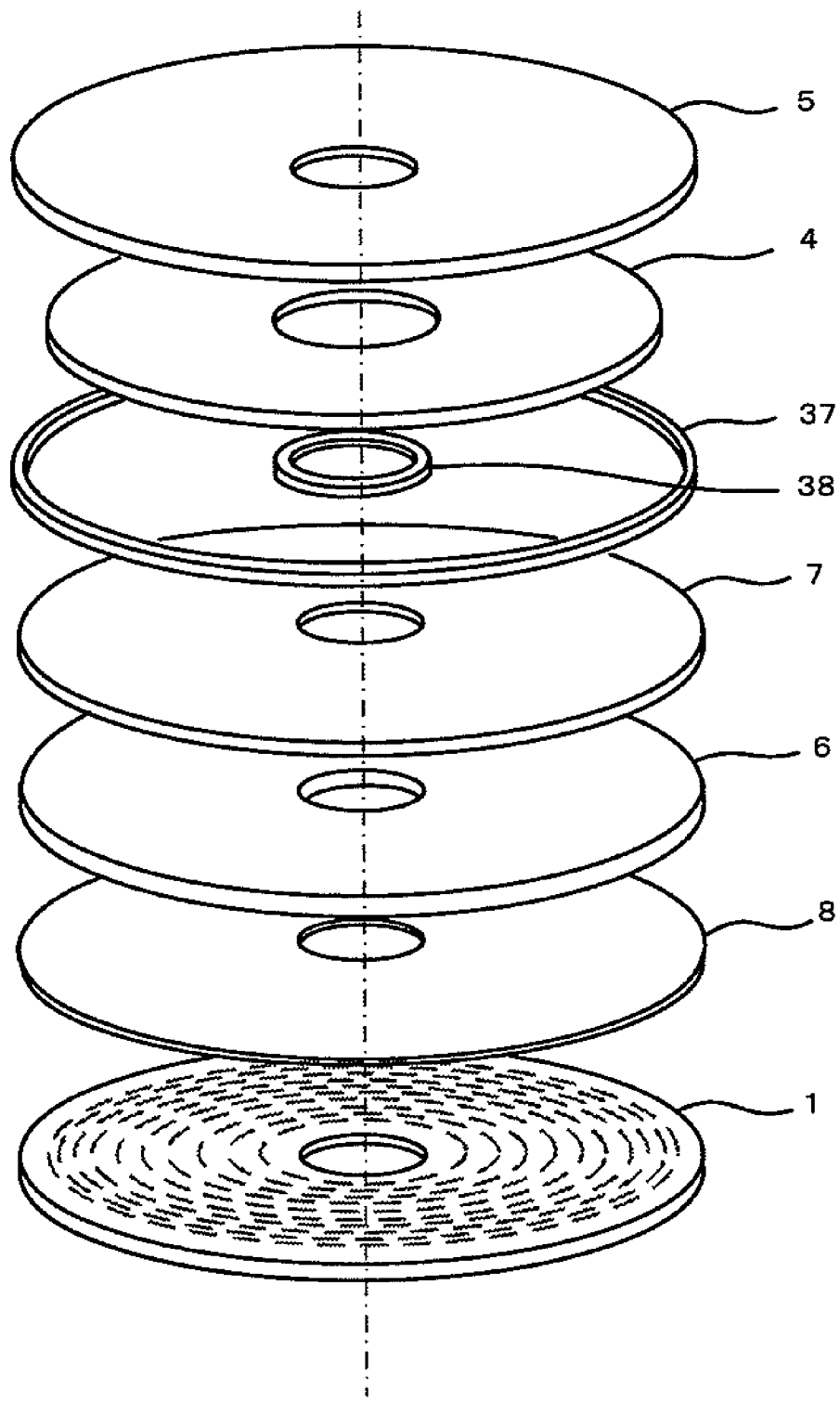
FIG. 6 is an exploded perspective view exemplarily showing the layer structure of an optical recording medium of the present invention.

Examples of the cross-sectional shape of the outer circumferential spacer include quadrangle, rectangle, trapezoid, circle, and ellipse. Among these, quadrangle, trapezoid, and rectangle are preferable for achieving uniform thickness. The outer circumferential spacer 37 shown in FIG. 6 is an example of a spacer with a quadrangular cross-sectional shape.

The thickness of the outer circumferential spacer is not particularly limited and can be appropriately set depending on the intended purpose. For example, the outer circumferential spacer preferably has substantially the same thickness as the recording layer, specifically, 100 μm to 1,000 μm.

The width of the outer circumferential spacer is not particularly limited as long as it is at least 0.5 mm and can be appropriately set depending on the intended purpose. For example, the width of the outer circumferential spacer is preferably 0.5 mm to 5 mm, more preferably 0.5 mm to 3 mm, most preferably 0.5 mm to 2 mm. If the width is less than 0.5 mm, a retaining function for making the thickness of the recording layer constant may be deteriorated due to a reduced mechanical strength or supporting area. If the width is more than 5 mm, holographic recording region is narrowed, and recording capacity may be impaired.

The material for the outer circumferential spacer is not particularly limited. Inorganic and organic materials can be suitably used.

Examples of the inorganic materials include glass, ceramic, quartz and silicon.

The organic materials are not particularly limited and can be appropriately selected depending on the intended purpose. Examples of the organic materials include acetate resins such as triacetylcellulose, polyester resins, polyethersulfone resins, polysulfone resins, polycarbonate resins, polyamide resins, polyimide resins, polyolefin resins, acrylic resins, polynorbornene resins, cellulose resins, polyarylate resins, polystyrene resins, polyvinylalcohol resins, polyvinyl chloride resins, polyvinylidene chloride resins, and polyacrylic resins. These may be used singularly or in combination. Among these, polycarbonate resins and acrylic resins are preferable in light of their formability, peeling properties, and costs.

The manufacturing method for the spacer is not particularly limited and can be appropriately selected depending on the intended purpose; examples thereof include injection molding, blow molding, compression molding, vacuum molding, extrusion molding, and cutting machining.

—Inner Circumferential Spacer—

The shape of the inner circumferential spacer is not particularly limited as long it is substantially identical to the shape of the opening which the optical recording medium is provided with, and can be appropriately selected depending on the intended purpose; examples thereof include quadrangle, circle, ellipse, and polygon. Among these, circle is preferable.

Preferably, the cross-sectional shape of the inner circumferential spacer is the same as that of the outer circumferential spacer; examples thereof include quadrangle, rectangle, trapezoid, circle, and ellipse. Among these, quadrangle, trapezoid, and rectangle are preferable for achieving uniform thickness.

The thickness of the inner circumferential spacer is required to be the same as that of the outer circumferential spacer in view of the uniformity of the thickness of the recording layer.

The width of the inner circumferential spacer may be the same as or different from that of the outer circumferential spacer in view of function to retain the uniformity of the thickness of the recording layer and in order to ensure the recording region of the recording layer. The material for the inner circumferential spacer and the manufacturing method of the inner circumferential spacer may be different from or may be the same as those of the outer circumferential spacer.

<Filter Layer Forming Step>

The filter layer forming step is a step in which the optical recording medium filter of the present invention is processed into the optical recording medium shape, and the processed filter is bonded to the second substrate to form a filter layer. The manufacturing method for the filter is as described above. Note, however, that it is possible to directly form the filter layer on the substrate depending on the circumstances. For example, a coating solution for coloring material-containing layer is applied onto the substrate to form a coloring material-containing layer, and a dielectric thin film is formed on the coloring material-containing layer by sputtering.

The shape of the optical recording medium is, for example, disc shape or card shape. The method for processing the filter into the optical recording medium shape is not particularly limited, and can be appropriately selected depending on the intended purpose. For example, a cutting process with a press cutter, or a stamping process with a stamping cutter can be used. The filter is bonded to the substrate by use of, for example, an adhesive or agglutinant while avoiding entry of air bubbles.

The adhesive is not particularly limited and can be appropriately selected depending on the intended purpose; examples thereof include UV curable adhesives, emulsion adhesives, one-component curable adhesives and two-component curable adhesives. These known adhesives can be used in any combination.

The agglutinant is not particularly limited and can be appropriately selected depending on the intended purpose; examples thereof include rubber agglutinants, acrylic agglutinants, silicone agglutinants, urethane agglutinants, vinylalkyl ether agglutinants, polyvinylalcohol agglutinants, polyvinylpyrrolidone agglutinants, polyacrylamide agglutinants and cellulose agglutinants.

The thickness of the adhesive or agglutinant applied is not particularly limited and can be appropriately set depending on the intended purpose. In the case of adhesive, the thickness is preferably 0.1 μm to 10 μm, more preferably 0.1 μm to 5 μm in light of the optical properties and slimness. In the case of agglutinant, the thickness is preferably 1 μm to 50 μm, more preferably 2 μm to 30 μm.

<First Gap Layer Forming Step>

The first gap layer forming step is a step in which a first gap layer is formed between the second substrate and the filter layer. The method for forming the first gap layer is not particularly limited and can be appropriately selected depending on the intended purpose. The first gap layer can be formed on the second substrate by, for example, spin coating, bonding a non-heat softening sheet, vapor deposition, or sputtering.

<Laminate Forming Step>

The laminate forming step is a step in which the first substrate is bonded to the second substrate over which the recording layer, filter layer and first gap layer have been formed through the recording layer disposing step, filter layer forming step, and first gap layer forming step, to form a laminate. Where necessary, the laminate forming step may include additional step(s) appropriately selected.

The method for bonding is not particularly limited and can be appropriately selected depending on the intended purpose. For example, the first substrate, second substrate, and optional additional layer(s) appropriately selected are bonded with an adhesive, pressure-bonded without using an adhesive, or bonded in vacuum.

The method for bonding with an adhesive is carried out as follows. Outer circumferences of the first substrate, second substrate, and optional additional layer(s) appropriately selected are aligned, an adhesive is applied between adjacent layers and bonded at 23° C. to 100° C. with a pressure of 0.01 MPa to 0.5 MPa applied from the outside.

Bonding is preferably performed in vacuum in order to avoid generation of air bubbles during the bonding.

—Adhesive—

The adhesive is not particularly limited and can be appropriately selected depending on the intended purpose; examples thereof include acrylic adhesives, epoxy adhesives, and rubber adhesives. Among these, acrylic adhesives and epoxy adhesives are preferable in view of transparency, etc.

The method for pressure-bonding without using any adhesive can be carried out by allowing layers to adhere to each other by utilizing their adhesiveness, to form a laminate. Outer circumferences of the first substrate, second substrate, and optional additional layer(s) are aligned and bonded at 23° C. to 100° C. with a pressure of 0.01 MPa to 0.5 MPa given from the outside. Bonding is preferably performed in vacuum in order to avoid entry of air bubbles during the adhesion.

<Additional Step>

The additional step is not particularly limited and can be appropriately selected depending on the intended purpose; examples thereof include a second gap layer forming step of forming a second gap layer between the recording layer and filter layer, and a side surface sealing step of sealing the entire side surface of the optical recording medium with an adhesive.

Specific Example 1 of Optical Recording Medium

Figure 7:
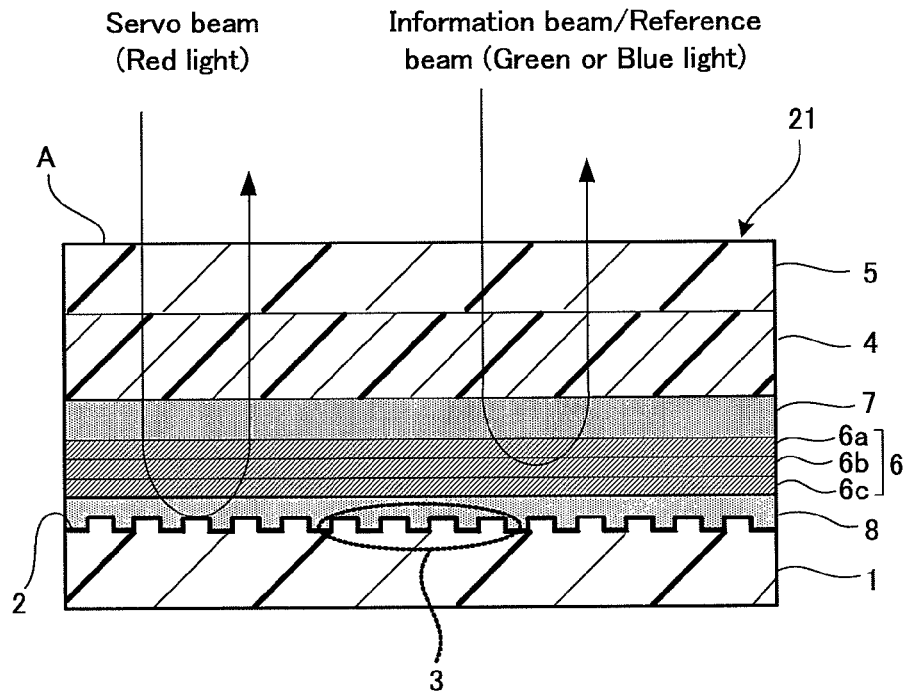
FIG. 7 is a schematic cross-sectional view exemplarily showing an optical recording medium according to Embodiment 1 of the present invention.

FIG. 7 is a schematic cross-sectional view showing the structure of an optical recording medium of the specific example 1 of the present invention. In the optical recording medium 21 according to this specific example 1 servo pit patterns 3 are formed on a second substrate 1 made of polycarbonate resin or glass, and the serve pit patterns 3 are coated with Al, Au, Pt or the like to form a reflective film 2. Although the servo pit patterns 3 are shown to be formed on the entire surface of the second substrate 1 in FIG. 7, it may be formed on the second substrate 1 periodically. In addition, the height of the servo pit patterns 3 are generally 1,750 angstrom (175 nm), far smaller than those of the other layers, including substrates.

A first gap layer 8 is formed by applying a material such as a UV curable resin over the reflective film 2 of the second substrate 1 by spin coating or the like. The first gap layer 8 protects the reflective film 2. At the same time, the first gap layer 8 is effective to adjust the size of holograms formed in the recording layer 4. Specifically, since somewhat large regions where optical interference between information and recording reference beams takes place need to be secured in the first recording layer 4, it is effective to provide a gap between the recording layer 4 and the servo pit patterns 3. A filter layer 6 is provided on the first gap layer 8, and a second gap layer 7 is provided between the filter layer 6 and recording layer 4. By sandwiching the second gap layer 7 and recording layer 4 with the filter layer 6 and first substrate 5 (polycarbonate resin substrate or glass substrate), an optical recording medium 21 is fabricated. There is a point at which information and reference beams focus; if this area is embedded in photopolymers, excessive exposure takes places and thus an excess amount of monomers are consumed, leading to poor multiplex recording performance. To avoid this, it is effective to provide a transparent, inert second gap layer 7.

In FIG. 7, the filter layer 6 transmits therein only a red light beam and reflects light beams of the other colors. Thus, the information and reference beams for recording and reproduction do not pass through the filter layer 6 because they are green or blue light, and never reach the reflective film 2, becoming returning beams emitting from light entrance/exit surface A.

The filter layer 6 is constituted of three cholesteric liquid crystal layers 6a, 6b and 6c whose helical pitch is continuously changed in the thickness direction thereof. The filter layer 6 may be directly provided on the first gap layer 8 with a coating method, or may be provided by stamping a film in which a cholesteric liquid crystal layer is formed on a base material into the optical disc shape. With such three cholesteric liquid crystal layers in which the helical pitch is continuously changed in the thickness direction, a reflectivity of 40% or more can be realized in cases of the range of $\lambda_0$ to $\lambda_0/\cos 20°$, in particular, the ranges of $\lambda_0$ to $\lambda_0/\cos 40°$ (where $\lambda_0$ is the wavelength of incident light), and the selective reflection wavelength will not vary even when the incident angle is changed.

The optical recording medium 21 of specific example 1 may be a disc shape or card shape. There is no need to provide a servo pit pattern in a case where the optical recording medium 21 is a card shape. In the optical recording medium 21 the second substrate 1 is 0.6 mm in thickness, the first gap layer 8 is 100 μm in thickness, the filter layer 6 is 2 μm to 3 μm in thickness, the second gap layer 7 is 70 μm in thickness, the recording layer 4 is 0.6 mm in thickness, and the first substrate is 0.6 mm in thickness, bringing to the total to about 1.9 mm.

Figure 10:
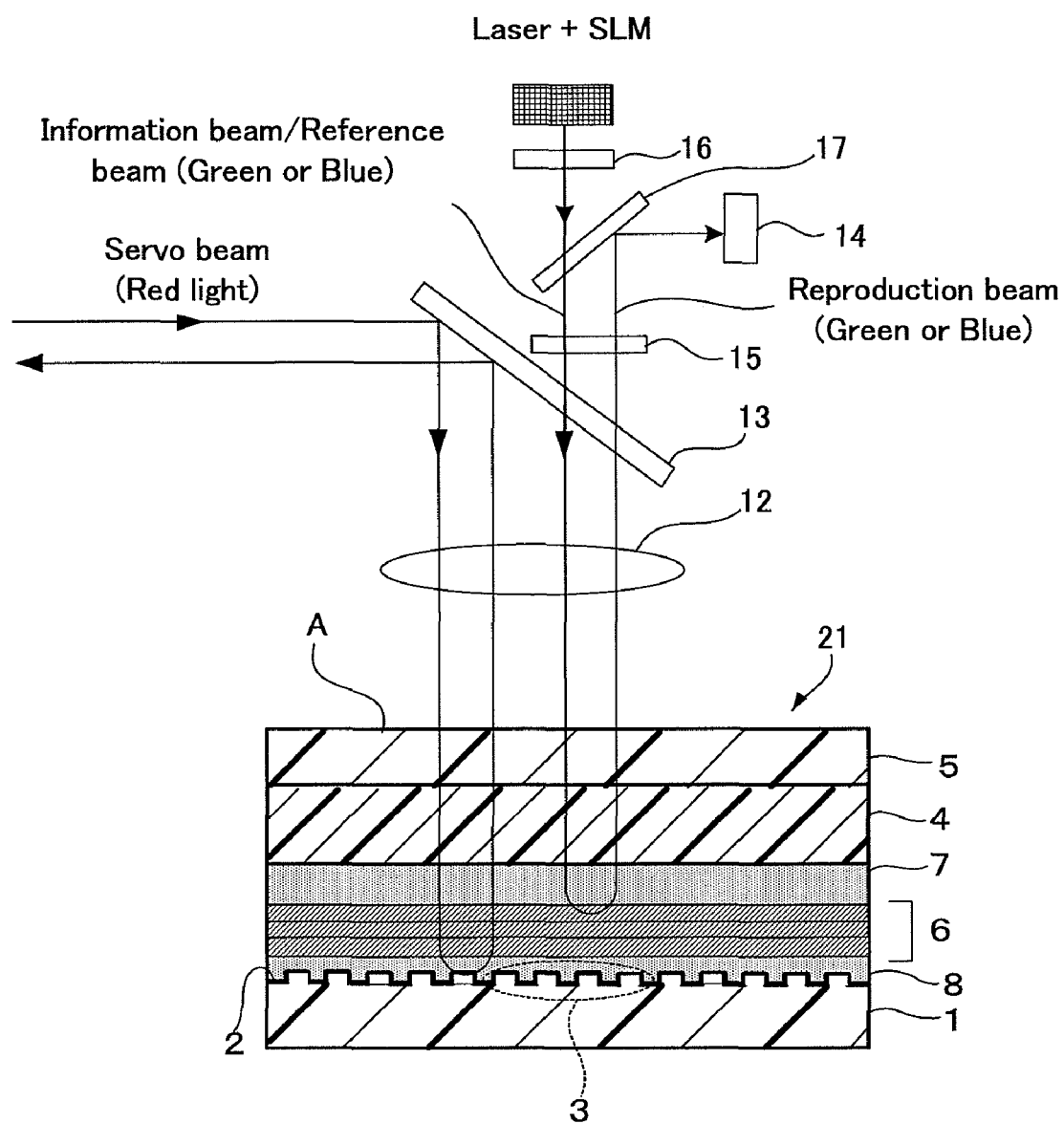
FIG. 10 is a view explaining one example of optical systems placed in the peripheral region of an optical recording medium of the present invention.

Next, optical operations around the optical recording medium 21 will be described with reference to FIG. 10. At first, a red light beam emitted from a servo laser source is reflected by a dichroic mirror 13 by almost 100%, and passes through an object lens 12. By this, the servo beam is applied onto the optical recording medium 21 in such a way that it focuses on the reflective film 2. More specifically, the dichroic mirror 13 is so configured that it admits only a green or blue light beam but reflects almost 100% of the red light beam. The servo beam incident from the light entrance/exit surface A of the optical recording medium 21 passes through the first substrate 5, recording layer 4, second gap layer 7, filter layer 6 and first gap layer 8, is reflected by the reflective film 2, and passes again through the first gap layer 8, filter layer 6, second gap layer 7, recording layer 4 and first substrate 5 to emit from the light entrance/exit surface A. The returning servo beam passes through the object lens 12 and is reflected by the dichroic mirror 13 by almost 100%, and then a servo information detector (not shown) detects servo information in the returning servo beam. The detected servo information is used for the focus servo operation, tracking servo operation, slide servo operation, and the like. The holographic material constituting the recording layer 4 is designed so as not to be sensitive to red light. For this reason, even when the servo beam has passed through the recording layer 4 or has been reflected diffusively by the reflective film 2, the recording layer 4 is not adversely affected. In addition, the returning servo beam that has been reflected by the reflective film 2 is reflected by the dichroic mirror 13 by almost 100%. Accordingly, the servo beam is not detected by a CMOS sensor or CCD 14 used for the detection of reconstructed images, and thus does not act as a noise component in the reproduction beam.

Figure 9:
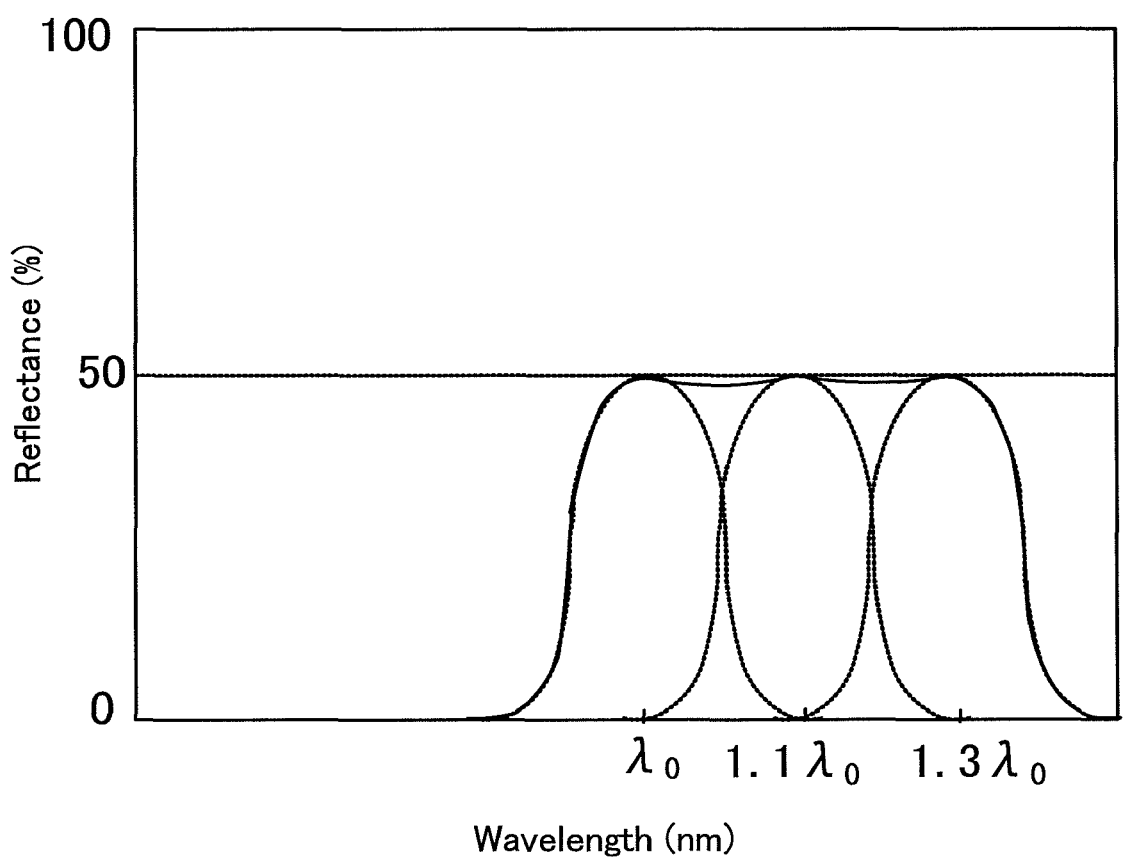
FIG. 9 is a graph showing reflection properties of a filter in which three cholesteric liquid crystal layers are overlaid, to an incident light emitted from the front surface (0°) of the filter.

In the reflection areas of from $\lambda_0$ to $1.3\lambda_0$ shown in FIG. 9, when the wavelength $\lambda_0$ is 532 nm, the wavelength of $1.3\lambda_0$ is 692 nm, and the servo beam has a wavelength of 655 nm, the beam is reflected. The reflection areas of $\lambda_0$ to $1.3\lambda_0$ shown in the figure are applicability to incident light of $\pm 40°$ at the filter layer. However, when a largely inclined beam is actually used, the servo area control can be controlled by masking a servo beam applied at an incidence angle of within $\pm 20°$ and using it, without causing any troubles. Further, by sufficiently increasing the helix pitch of cholesteric liquid crystal layers in a filter layer used, the incident angles can be readily set within the ranges of $\pm 20°$ in the filter layer. In this case, cholesteric liquid crystal layers having $\lambda_0$ to $1.1\lambda_0$ can be used, and thus there is no problem caused with transmission of the servo beam.

Both the information and recording reference beams generated in the recording/reproduction laser source pass through a polarizing plate 16 and are linearly polarized. The linearly polarized beams then pass through a half mirror 17 and are circularly polarized by a quarter wave plate 15. The circularly polarized beams then pass through the dichroic mirror 13 and the object lens 12, and are applied onto the optical recording media 21 in such a way that optical interference takes place between the information beam and recording reference beam to create interference images in the recording layer 4. The information and recording reference beams are incident from the light entrance/exit surface A and interact with each other in the recording layer 4 to form an interference image to be recorded there. Thereafter, the information and recording reference beams pass through the recording layer 4, launching into the filter layer 6. There, before reaching the bottom of the filter layer 6, the beams are reflected and become returning beams. More specifically, the information and recording reference beams do not reach the reflective film 2. This is because the filter layer 6 is formed of three cholesteric liquid crystal layers whose helical pitch is continuously changed in the thickness direction and thus admits only red light. Moreover, if the intensity of light that has undesirably passed through the filter layer 6 is suppressed to 20% or less of that of the incident light, there will be no practical problems even when such light reaches the bottom of the filter layer 6 and is reflected back as a returning beam, because this returning beams is again reflected by the filter layer 6 and its intensity in a reproduction beam is as small as 4% (20%×20%) or less of that of the reproduction beam.

Specific Example 2 of Optical Recording Medium

Figure 8:
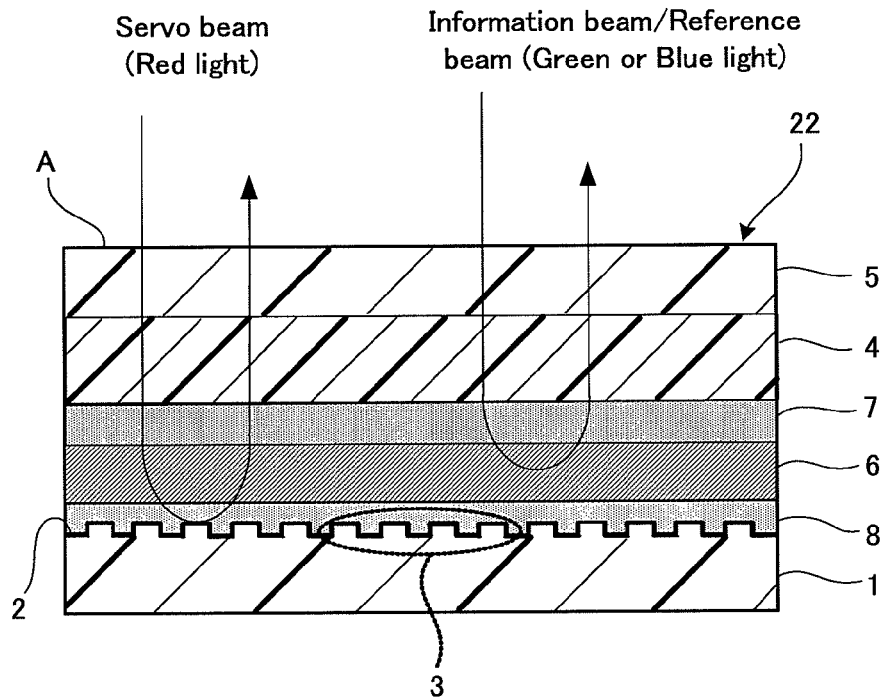
FIG. 8 is a schematic cross-sectional view exemplarily showing an optical recording medium according to Embodiment 2 of the present invention.

FIG. 8 is a schematic cross sectional view of the structure of an optical recording medium in specific example 2. The optical recording medium 22 is identical to that of specific example 1 except for the structure of the filter layer 6.

In FIG. 8, the filter layer 6 transmits therein only a red light beam and reflects light beams of the other colors. Thus, the information and reference beams for recording and reproduction do not pass through the filter layer 6 because they are green or blue light, and never reach the reflective film 2, becoming returning beams emitting from light entrance/exit surface A.

This filter layer 6 is a laminate formed of a dielectric material-deposited layer consisting of 7 thin dielectric films with different refractive indices provided on a coloring material-containing layer. The filter layer 6 composed of the coloring material-containing layer and dielectric material-deposited layer may be directly formed on the first gap layer 8 by coating and vapor deposition, or may be provided by stamping a film, in which the coloring material-containing layer and dielectric material-deposited layer are formed on a base material, into an optical disc shape. With such a filter layer formed of the coloring material-containing layer and dielectric material-deposited layer, light transmittance of 30% or more can be realized for light with a wavelength of 655 nm and a reflectivity of 30% or more can be obtained for light with a wavelength of 532 nm in cases where the light incident angle is $\pm 40°$, thereby enabling selective light reflection.

The optical recording medium 22 of specific example 2 may be a disc shape or card shape, and is fabricated in the same manner as in specific example 1.

Next, optical operations around the optical recording medium 22 fabricated in the same manner as the optical recording medium 21 will be described with reference to FIG. 10. In the optical recording medium 22, as in the case of the optical recording medium 21, a red light beam emitted from the servo laser source is reflected by the dichroic mirror 13 by almost 100%, and passes through the object lens 12. By this, the servo beam is applied onto the optical recording medium 22 in such a way that it focuses on the reflective film 2. More specifically, the dichroic mirror 13 is so configured that it transmits only a green or blue light beam but reflects almost 100% of the red light beam. The servo beam incident from the light entrance/exit surface A of the optical recording medium 22 passes through the first substrate 5, recording layer 4, second gap layer 7, filter layer 6 and first gap layer 8, is reflected by the reflective film 2, and passes again through the first gap layer 8, filter layer 6, second gap layer 7, recording layer 4 and first substrate 5 to emit from the light entrance/exit surface A. The returning servo beam passes through the object lens 12 and is reflected by the dichroic mirror 13 by almost 100%, and then the servo information detector (not shown) detects servo information in the returning servo beam. The detected servo information is used for the focus servo operation, tracking servo operation, slide servo operation, and the like. As in specific example 1, the holographic material constituting the recording layer 4 is designed so as not to be sensitive to red light. For this reason, even when the servo beam has passed through the recording layer 4 or has been reflected diffusively by the reflective film 2, the recording layer 4 is not adversely affected. In addition, the returning servo beam that has been reflected by the reflective film 2 is reflected by the dichroic mirror 13 by almost 100%. Accordingly, the servo beam is not detected by the CMOS sensor or CCD 14 used for the detection of reconstructed images, and thus does not act as a noise component in the reproduction beam.

Both the information and recording reference beams generated in the recording/reproduction laser source pass through the polarizing plate 16 and are linearly polarized. The linearly polarized beams then pass through the half mirror 17 and are circularly polarized by the quarter wave plate 15. The circularly polarized beams then pass through the dichroic mirror 13 and the object lens 12, and are applied onto the optical recording media 22 in such a way that optical interference takes place between the information beam and recording reference beam to create interference images in the recording layer 4. The information and recording reference beams are incident from the light entrance/exit surface A and interact with each other in the recording layer 4 to form an interference image to be recorded there. Thereafter, the information and recording reference beams pass through the recording layer 4, launching into the filter layer 6. There, before reaching the bottom of the filter layer 6, the beams are reflected and become returning beams. More specifically, the information and recording reference beams do not reach the reflective film 2. This is because the filter layer 6 is formed of the coloring material-containing layer and dielectric material-deposited film and thus transmits only red light. Moreover, if the intensity of light that has undesirably passed through the filter layer 6 is suppressed to 20% or less of that of the incident light, there will be no practical problems even when such light reaches the bottom of the filter layer 6 and is reflected back as a returning beam, because this returning beams is again reflected by the filter layer 6 and its intensity in a reproduction beam is as small as 4% (20%×20%) or less of that of the reproduction beam.

(Optical Reproduction Method)

The optical reproduction method is not particularly limited and may be suitably selected in accordance with the purpose. Examples of the optical reproduction method include a method of reproducing a recorded information by irradiating an optical recording medium with the information recorded by the optical recording method of the present invention with a light beam, which is identical to a reference beam used in the recording, from the same direction as the direction of the reference beam applied. When an interference image formed on a recording layer of the optical recording medium of the present invention, a diffracted beam having an intensity distribution corresponding to a distribution of optical properties formed as recorded information corresponding to the interference image inside of the recording layer is generated, and the diffracted beam is applied to a CCD or the like, thereby making it possible to reproduce the recorded image.

(Optical Recording/Reproducing Apparatus)

The optical recording method and optical reproduction method of the present invention can be carried out by the use of the optical recording/reproducing apparatus.

The specific example of the optical recording/reproducing apparatus used in the optical recording method and optical reproduction method is described with reference to FIG. 11.

Figure 11:
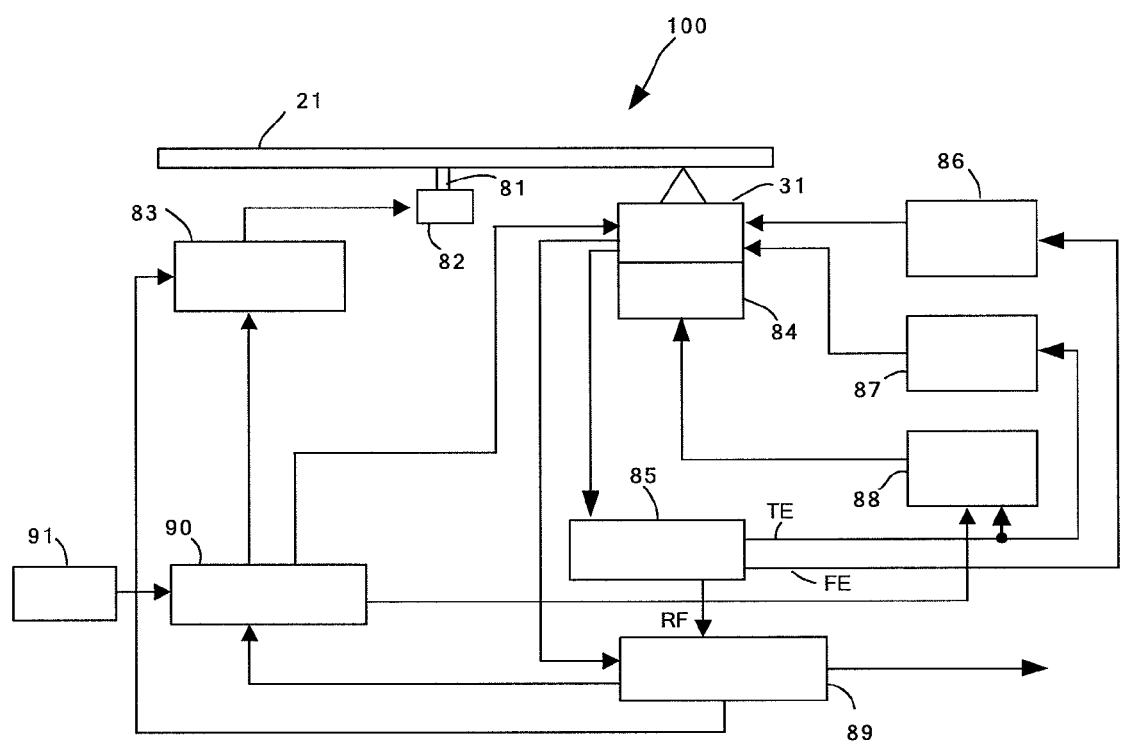
FIG. 11 is a block diagram exemplarily showing the entire structure of an optical recording/reproducing apparatus of the present invention.

FIG. 11 shows the overall configuration of an optical recording/reproducing apparatus according to the present invention. Note that the optical recording/reproducing apparatus includes an optical recording device and an optical reproducing device, whereby information can be recorded on or reproduced from an optical recording medium.

The optical recording/reproducing apparatus 100 includes a spindle 81 to which an optical recording medium 21 is attached, a spindle motor 82 for spinning the spindle 81, and a spindle servo circuit 83 for controlling the spindle motor 82 so that the rotational speed of the optical recording medium 21 is constant at a predetermined level.

Further, the optical recording/reproducing apparatus 100 is equipped with a pickup 31 for recording information by irradiating the optical recording medium 21 with an information beam and a reference beam for recording as well as for reproducing information recorded in the optical recording medium 21 by irradiating the optical recording medium 21 with a reference beam for reproducing and detecting a reproduction beam; and a drive device 84 enabling the pickup 31 to move in a radius direction of the optical recording medium 21

The optical recording/reproducing apparatus 100 includes a detection circuit 85 for detecting a focus error signal FE, a tracking error signal TE and a reproduction signal RF from the output signal of the pickup 31, a focus servo circuit 86 for performing a focus servo operation by driving an actuator inside the pickup 31 on the basis of the focus error signal FE detected by the detection circuit 85 to move an object lens (not shown) in the thickness direction of the optical recording medium 21, a tracking servo circuit 87 for performing a tracking servo operation by driving an actuator inside the pickup 31 on the basis of the tracking error signal TE detected by the detection circuit 85 to move the object lens in the radial direction of the optical recording medium 21, and a slide servo circuit 88 for performing a slide servo operation by controlling the drive device 84 on the basis of a tracking error signal TE and commands from a controller to be described later to move the pickup 31 in the radial direction of the optical recording medium 21.

Furthermore, the optical recording/reproducing apparatus 100 includes a signal processing circuit 89 which creates a reference clock and distinguishes individual addresses on the basis of a reproduction signal RF from the detection circuit 85 and data correction circuit (not shown) for correcting the above-mentioned deformation amount by decoding output data of a CMOS or CCD array (to be described later) in the pickup 31 so that data recorded on the data area of the optical recording medium 21 is reproduced, a controller 90 for controlling overall of the optical recording apparatus 100, and a operation unit 91 for giving a variety of commands to the controller 90.

The controller 90 receives the reference clock and address information outputted from the signal processing circuit 89 and controls, for example, the pickup 31, spindle servo circuit 83 and slide servo circuit 88. The spindle servo circuit 83 receives the reference clock outputted from the signal processing circuit 89. The controller 90 includes a central processing unit (CPU), read only memory (ROM) and random access memory (RAM), and the CPU realizes the function of the controller 90 by executing programs stored in the ROM on the RAM, a working area.

Examples

Hereinafter, the present invention will be further described in detail with reference to specific Examples, however, the present invention is not limited to the disclosed Examples.

Example 1

Production of Optical Recording Medium

An optical recording medium of Example 1 was produced in the following manner so as to have a first substrate, a recording layer, a second gap layer, a filter layer, a first gap layer, and a second substrate in this order. For the filter layer, a film-shaped filter was firstly prepared, the filter was deposited, and thus the filter layer was formed.

—Composition of Photosensitive Composition Solution for Recording Layer—

A photosensitive composition having the following composition was mixed under nitrogen airflow to prepare a photosensitive composition solution:

| | |
|---|---|
| biscyclohexylmethane diisocyanate | 31.5% by mass |
| polypropylene oxide triol (molecular weight: 1,000) | 61.2% by mass |
| tetramethylene glycol | 2.5% by mass |
| 2,4,6-tribromophenyl acrylate | 3.1% by mass |
| photopolymerization initiator (IRGACURE 784, manufactured by Chiba Specialty Chemicals K.K.) | 0.69% by mass |
| dibutyltin dilaurate | 1.01% by mass |

—Preparation of Filter—

On a polycarbonate film (manufactured by Teijin Chemicals, Ltd.) having a thickness of 80 μm, $SiO^2$ and $TiO^2$ were alternately deposited in 15 layers by vacuum evaporation. Specifically, on the polycarbonate film, an $SiO^2$ layer was deposited in thickness of 90 nm, subsequently a $TiO^2$ layer was deposited in thickness of 50 nm, and the above process was repeated to thereby form a dielectric deposition layer. The last deposited layer was $SiO^2$ layer. Note that it is preferred that the thickness of each of the deposited layers be $\lambda/4$ n ($\lambda$=wavelength of recording light beam; n=refractive index of material used). Therefore, in this Example, $\lambda$ was set to 532 nm, the refractive index of $SiO^2$ was set to 1.5; and the refractive index of $TiO^2$ layer was set to 2.5.

As the filter layer in this Example, besides a selectively reflective layer composed of inorganic materials as described above, a selectively reflective layer composed of organic materials may be employed. Hereinafter, a production method of a selectively reflective layer composed of organic materials will be specifically explained.

Firstly, on a polycarbonate film (product name: UPILON, manufactured by Mitsubishi Gas Chemical Co.) having a thickness of 100 μm, a base film was set, which was prepared by applying polyvinyl alcohol (product name: MP203, manufactured by KURARAY Co., Ltd.) so as to have a thickness of 1 μm. The base film was passed through a rubbing device for subjecting a surface of the polyvinyl alcohol film to a rubbing treatment, thereby imparting a liquid crystal alignment function thereon.

Subsequently, cholesteric liquid crystal layer coating solutions A, B, and C each having a composition described in Table 1 below were prepared by a common method.

TABLE 1

| Component | Cholesteric liquid crystal layer coating solution | | |
|---|---|---|---|
| (part by mass) | A | B | C |
| UV polymerizable liquid crystal | 93.16 | 94.02 | 94.74 |
| Chiral agent | 6.84 | 5.98 | 5.26 |
| Photopolymerization initiator | 0.10 | 0.10 | 0.10 |
| Sensitizer | 0.02 | 0.02 | 0.02 |
| Solvent | 400 | 400 | 400 |

* UV polmerizable liquid crystal: product name, PALIOCOLOR LC242, manufactured by BASF Corp.
* chiral agent: product name, PALIOCOLOR LC756, manufactured by BASF Corp.
* photopolymerization intitiator: product name, IRGACURE 369, manufactured by Chiba Specialty Chemicals K.K.
* sensitizer: diethylthioxanthone
* solvent: methylethylketone (MEK)

The cholesteric liquid crystal layer coating solution A was applied onto the base film by the use of a bar coater, and the coated surface was dried and then aged at 110° C. for 20 seconds for alignment. Thereafter, the coated surface was exposed at irradiation energy of 500 mJ/cm² at 110° C. using a ultra-high-pressure mercury lamp, thereby forming a cholesteric liquid crystal layer-cured film A having a thickness of 2 μm.

Next, on the cholesteric liquid crystal layer A, the cholesteric liquid crystal layer coating solution B was applied with the use of a bar coater, and the coated surface was dried and then aged at 110° C. for 20 seconds for alignment. Thereafter, the coated surface was exposed at irradiation energy of 500 mJ/cm² at 110° C. using a ultra-high-pressure mercury lamp, thereby forming a cholesteric liquid crystal layer-cured film B having a thickness of 2 μm.

Next, on the cholesteric liquid crystal layer B, the cholesteric liquid crystal layer coating solution C was applied with the use of a bar coater, and the coated surface was dried and then aged at 110° C. for 20 seconds for alignment. Thereafter, the coated surface was exposed at irradiation energy of 500 mJ/cm² at 110° C. using a ultra-high-pressure mercury lamp, thereby forming a cholesteric liquid crystal layer-cured film C having a thickness of 2 μm.

By the processes described above, an optical recording medium filter having circular polarization separation characteristics and composed of organic materials having three structures in which the cholesteric liquid crystal layers had different central selective reflection wavelengths, and each of the liquid crystal helix in the cholesteric liquid crystal layers rotated in a same clockwise direction.

Next, the thus prepared optical recording medium filter was punched in a disc size so that it could be set on the substrate.

—First Substrate—

For the first substrate, a glass substrate having a diameter of 120 mm and a plate thickness of 0.5 mm was used. The glass substrate had smooth surfaces where there were no convexoconcaves or irregularities such as servo pit pattern.

On one surface of the first substrate, a reflection preventing layer was formed so that when a light beam having a wavelength of 532 nm was incident in a direction perpendicular thereto, the reflection preventing layer had a reflectivity of 0.1%.

—Second Substrate—

For the second substrate, a substrate made of polycarbonate resin typically used for DVD+RW having a diameter of 120 mm and a plate thickness of 0.6 mm was used. Over the entire substrate surface, a servo pit pattern was formed, and the substrate had a track pitch of 0.74 μm, a groove depth of 175 nm and a groove width of 300 nm.

Firstly, a reflective film was deposited on the servo pit pattern surface of the second substrate so that when a light beam having a wavelength of 532 nm was incident in a direction perpendicular thereto, the reflective film had a reflectivity of 90%. As the material for the reflective film, aluminum (Al) was used, and an Al reflective film having a thickness of 200 nm was deposited by DC magnetron sputtering.

—Outer Circumferential Spacer—

The shape of the outer circumferential spacer was substantially identical to the outer circumferential shape of the first substrate and the second substrate. Specifically, the outer circumferential spacer was circular in shape, having a diameter of 120 mm, a width in its planer direction of 0.5 mm±100 μm, a thickness of 500 μm, which was substantially same as that of a recording layer 4. Therefore, the cross-sectional shape thereof was a quadrangle of 0.5 mm×500 μm.

The outer circumferential spacer was prepared using polycarbonate, which is superior in formability and mechanical strength, using an injection molder (manufactured by Sumitomo Heavy Industries Ltd.).

—Inner Circumferential Spacer—

As shown in FIG. 6, the shape of the inner circumferential spacer was substantially identical to the openings of the first substrate 5 and the second substrate 1. Specifically, the inner circumferential spacer was circular in shape, having a diameter of 15 mm, a width in its planer direction of 0.5 mm±100 μm, a thickness of 500 μm, identical to that of the recording layer 4. Therefore, the cross-sectional shape thereof was a quadrangle of 0.5 mm×500 μm, which was substantially identical to that of the outer circumferential spacer.

The inner circumferential spacer was prepared using polycarbonate, which is superior in formability and mechanical strength, using an injection molder (manufactured by Sumitomo Heavy Industries Ltd.).

—Formation of Laminate—

As shown in FIG. 6, onto the second substrate 1 spin-coated with a first gap layer 8 composed of an ultraviolet curable resin (type: SD-640, manufactured by Dainippon Ink and Chemicals, Inc.), a UV adhesive (type: SD-640, manufactured by Dainippon Ink and Chemicals, Inc.) was applied and then the filter was laminated so that air bubbles did not enter the gap therebetween, thereby forming a filter layer 6.

On a surface of the first substrate 5 on which the reflection preventing layer was not formed, a second gap layer 7 composed of a transparent polyethylene terephthalate sheet having a thickness of 500 μm was laminated by a laminator (type: HAL110aa, manufactured by Sankyo Co.) under the conditions of the temperature of a pressure roller: 23° C., pressure of the pressure roller: 0.1 MPa, and pressure bonding rate: 1.0 m/min.

Further, to the surface of the second gap layer 7, the obtained outer circumferential spacer 37 was bonded so that the outer shape of the outer circumferential spacer 37 coincided with the outer shape of the second substrate 1. Then, the inner circumferential spacer 38 was bonded so that the center of the inner circumferential spacer 38 coincided with the center of the second substrate 1. For the adhesive, a UV adhesive (type: SD-640, manufactured by Dainippon Ink and Chemicals, Inc.) was used, and the spacers were bonded by irradiating with ultraviolet ray.

Into the groove portion with 500 μm in depth, which was formed by the outer circumferential spacer 37 and the inner circumferential spacer 38, the obtained optical recording layer composition coating solution was injected with the use of a syringe by the injection method.

The conditions for the injection were set as follows. Temperature: 23° C., Solution viscosity: 300 mPas, and Humidity: 50%

After the injection, the optical recording layer composition was cured at 80° C. for 40 minutes to thereby form a recording layer 4. The recording layer 4 had a thickness of 500 μm.

Figure 5:
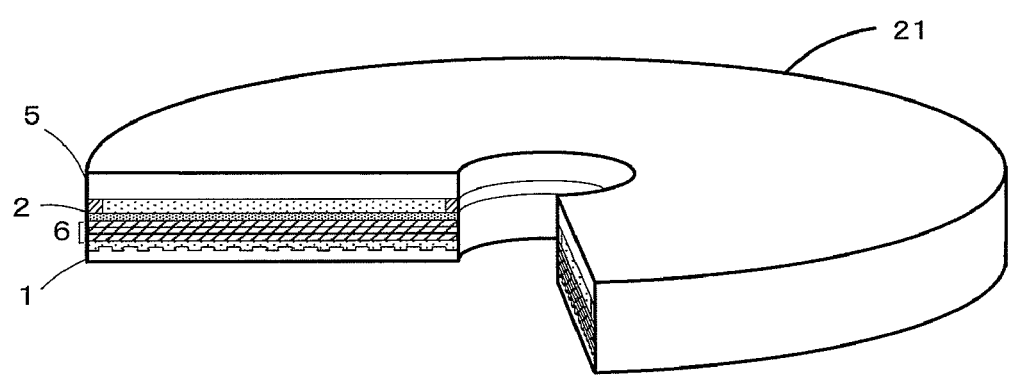
FIG. 5 is a partially cross-sectional view showing the structure of an optical recording medium of the present invention.

Over the surface of the recording layer, an adhesive (type: GM-9002, Brenny Giken) was applied, the outside of the first substrate and the outside of the second substrate were pressurized at a pressure of 0.08 MPa and at 80° C. for 40 minutes to form a laminate. Finally, the edge of the laminate was sealed with a moisture-curable type adhesive and left at 45° C. for 24 hours, thereby producing an optical recording medium substantially similar to the optical recording medium 21 shown in FIGS. 5 and 6.

—Recording on Optical Recording Medium—

On the obtained optical recording medium, information can be recorded using a recording/reproduction test apparatus, DDU1000, manufactured by PULSTEC INDUSTRIAL CO., LTD. In this recording method, in a focal position of a recording hologram, information of 1 bit per single recording can be recorded in a recording spot of 2 μm in diameter by irradiating a recording pulse for irradiation time of 100 nsec using a semiconductor laser having a peak intensity of light of 10 mW and capable of continuous oscillation $5 \times 10^5$ times during 1 msec. In such an optical recording method, a series of multiplex holograms can be recorded even when the peak intensity of light per single recording is reduced during irradiation of an information beam and a reference beam.

—Reproduction on Optical Recording Medium—

A multiplex hologram recorded on an optical recording medium by the optical recording method according to the present invention can be highly finely reproduced by the use of a recording/reproducing test apparatus, DDU1000.

In variant Examples, information of 4 bits, 16 bits etc. can be recorded by placing an SLM (special light modulator) in the midstream of the optical path of the optical system of DDU1000. In this case, information can be highly finely recorded with low energy, as just in the case of Example 1. Multiplex holograms recorded on a reproduction optical recording medium by the optical recording method can be highly finely reproduced by DDU1000.

Comparative Example 1

Recording on Optical Recording Medium

Information was recorded on the optical recording medium produced in Example in a similar manner to described in Example 1, except that the peak intensity of light of the recording pulse was changed to 10 mW, the irradiation time was changed to $1 \times 10^5$ nsec, and the irradiation with the recording pulse was carried out once per 1 msec.

—Reproduction on Optical Recording Medium—

The multiplex hologram recorded on the optical recording medium by the optical recording method of the present invention was reproduced by the DDU1000, however, it was impossible to appropriately reproduce the multiplex hologram due to track deviation.

INDUSTRIAL APPLICABILITY

An optical recording method of the present invention is an excellent method allowing for downsizing of optical systems by reducing the irradiation energy per single recording during irradiation of an information beam and a reference beam as well as allowing for applications of holographic recording to small-size optical systems used for CD and/or DVD, and can be suitably used for high-density recording media. Further, the optical recording method of the present invention can be suitably used for any of relatively thin type planar holographic recording media for recording information such as dimensional images etc., volume holographic recording media for volumetric information such as cubic images, transmissive recording media, and reflective recording media. The optical recording method can also be widely used as a method for recording various holograms such as an amplitude type hologram, phase-type hologram, brazed hologram and complex amplitude hologram, and further can be used as an optical recording method for storing information in CDs, DVDs, BDs, HDs, magnetic tapes, computer back-up tapes, and broadcast tapes.

An optical recording apparatus of the present invention is an excellent apparatus allowing for downsizing of optical systems by reducing the irradiation energy per single recording during irradiation of an information beam and a reference beam as well as allowing for applications of holographic recording to small-size optical systems used for CD and/or DVD, and can be suitably used for high-density recording media. Further, the optical recording apparatus of the present invention can be suitably used as an optical recording apparatus for recording on any of relatively thin type planar holographic recording media for recording information such as dimensional images etc., volume holographic recording media for volumetric information such as cubic images, transmissive recording media, and reflective recording media. The optical recording apparatus can also be widely used as an optical recording apparatus for recording various holograms such as an amplitude type hologram, phase-type hologram, brazed hologram and complex amplitude hologram, and further can be used as an optical recording medium for storing information used in CDs, DVDs, BDs, HDs, magnetic tapes, computer back-up tapes, and broadcast tapes.

The invention claimed is:

1. An optical recording method comprising:
    recording information on a recording layer for holographically recording information in an optical recording medium by irradiating the optical recording medium with an information beam and a reference beam, and repetitively recording information on the recording layer while moving at least any one of the information beam and reference beam and the recording layer along the surface of the recording layer, thereby being capable of shift-multiplex recording operations,
    wherein the optical recording medium is irradiated on a recording pulse basis, the peak intensity of light of the recording pulse is 0.1 mW to 100 mW, the irradiation time is 0.05 nsec to $1\times10^5$ nsec, and the irradiation of recording pulse is performed 5 times to $1\times10^7$ times per 1 msec.

2. The optical recording method according to claim 1, wherein information of 1 bit to 1,024 bits is recorded by irradiating with a single recording pulse.

3. The optical recording method according to claim 2, wherein the irradiation of the single recording pulse is performed with the use of a substantially circular recording spot, and the recording spot has an average diameter of 0.1 µm to 100 µm.

4. The optical recording method according to claim 1, wherein information is shift-multiplex-recorded by irradiating with the information beam and reference beam in a circumferential direction of the recording layer while rotating the optical recording medium having the recording layer.

5. The optical recording method according to claim 1, wherein the optical recording medium comprises a first substrate, the recording layer, a filter layer and a second substrate in this order.

6. The optical recording method according to claim 1, wherein the optical recording medium is a reflective holographic recording medium.

7. The optical recording method according to claim 1, wherein the optical recording medium is irradiated with the information beam and reference beam so that the optical axis of the information beam is collinear with the optical axis of the reference beam.

8. An optical recording apparatus comprising:
    a shift-multiplex recording unit configured to record information on a recording layer for holographically recording information in an optical recording medium by irradiating the optical recording medium with an information beam and a reference beam, and to repetitively record information on the recording layer while moving at least any one of the information beam and reference beam and the recording layer along the surface of the recording layer, and
    an irradiation unit configured to irradiate the optical recording medium on a recording pulse basis,
    wherein the peak intensity of light of the recording pulse is 0.1 mW to 100 mW, the irradiation time is 0.05 nsec to $1\times10^5$ nsec, and the irradiation of recording pulse is performed 5 times to $1\times10^7$ times per 1 msec.

9. An optical recording medium, with information recorded therein, which is recorded by an optical recording method,
    wherein the optical recording method comprises:
    recording information on a recording layer for holographically recording information in an optical recording medium by irradiating the optical recording medium with an information beam and a reference beam, and repetitively recording information on the recording layer while moving at least any one of the information beam and reference beam and the recording layer along the surface of the recording layer, thereby being capable of shift-multiplex recording operations,
    wherein the optical recording medium is irradiated on a recording pulse basis, the peak intensity of light of the recording pulse is 0.1 mW to 100 mW, the irradiation time is 0.05 nsec to $1\times10^5$ nsec and the irradiation of recording pulse is performed 5 times to $1\times10^7$ times per 1 msec.

10. An optical reproduction method comprising:
    irradiating an interference image formed on a recording layer by an optical recording method with a reproduction beam identical to a reference beam used in the recording of the interference image to thereby reproduce recorded information corresponding to the interference image,
    wherein the optical recording method comprises:
    recording information on the recording layer for holographically recording information in an optical recording medium by irradiating the optical recording medium with an information beam and the reference beam, and repetitively recording information on the recording layer while moving at least any one of the information beam and reference beam and the recording layer along the surface of the recording layer, thereby being capable of shift-multiplex recording operations,
    wherein the optical recording medium is irradiated on a recording pulse basis, the peak intensity of light of the recording pulse is 0.1 mW to 100 mW, the irradiation time is 0.05 nsec to $1\times10^5$ nsec, and the irradiation of recording pulse is performed 5 times to $1\times10^7$ times per 1 msec.

11. The optical reproduction method according to claim 10, wherein the recorded information is reproduced by irradiating the interference image with the reproduction beam so that the reproduction beam is irradiated to the interference image at the same angle of incidence as that of the reference beam used in the recording of the interference image in the optical recording medium.

* * * * *